(12) United States Patent
Ogasawara

(10) Patent No.: US 10,109,091 B2
(45) Date of Patent: Oct. 23, 2018

(54) IMAGE DISPLAY APPARATUS, IMAGE DISPLAY METHOD, AND STORAGE MEDIUM

(71) Applicant: CANON KABUSHIKI KAISHA, Tokyo (JP)

(72) Inventor: Taku Ogasawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 14/812,294

(22) Filed: Jul. 29, 2015

(65) Prior Publication Data

US 2016/0035117 A1 Feb. 4, 2016

(30) Foreign Application Priority Data

Jul. 31, 2014 (JP) ................. 2014-156337

(51) Int. Cl.

| G06T 11/60 | (2006.01) |
|---|---|
| G06T 3/40 | (2006.01) |
| G06K 9/00 | (2006.01) |
| G06K 9/22 | (2006.01) |

(52) U.S. Cl.
CPC .......... *G06T 11/60* (2013.01); *G06K 9/00456* (2013.01); *G06K 9/228* (2013.01); *G06T 3/40* (2013.01)

(58) Field of Classification Search
CPC .. G06T 11/60; G06T 3/40; G06T 7/70; G06K 9/228; G06K 9/00456; G06K 9/00771
USPC ....... 345/661, 660, 420, 522, 173, 472, 619, 345/634
See application file for complete search history.

(56) References Cited

U.S. PATENT DOCUMENTS

| 2005/0149877 A1* | 7/2005 | Rice ................ A61B 5/0059 715/764 |
| 2008/0240563 A1* | 10/2008 | Takano ............. H04N 5/23219 382/173 |
| 2010/0142762 A1* | 6/2010 | Morita ............. G06F 17/30259 382/115 |

(Continued)

FOREIGN PATENT DOCUMENTS

| JP | 2005-094711 A | 4/2005 |
| JP | 2013-190870 A | 9/2013 |

OTHER PUBLICATIONS

Office Action dated Jul. 26, 2016, in Japanese Patent Application No. 2014-156337.

*Primary Examiner* — Ke Xiao
*Assistant Examiner* — Kim-Thanh T Tran
(74) *Attorney, Agent, or Firm* — Fitzpatrick, Cella, Harper & Scinto

(57) ABSTRACT

Provided is an image display apparatus that includes an automatic recognition unit configured to automatically recognize a plurality of objects included in an image; a management unit configured to manage information related to the automatically recognized object as management information; a display control unit configured to display the object of the image on the screen based on the management information; and a specification unit configured to specify an object included in the image, wherein the management unit adds information related to the object specified by the specification unit to the management information, and the display control unit displays the object of the image based on the management information to which the information related to the specified object is added.

10 Claims, 33 Drawing Sheets

(56) References Cited

U.S. PATENT DOCUMENTS

| | | | |
|---|---|---|---|
| 2013/0108166 A1* | 5/2013 | Ptucha | G06T 11/60 382/195 |
| 2013/0235087 A1* | 9/2013 | Kashibuchi | G06T 11/60 345/660 |
| 2014/0059457 A1* | 2/2014 | Min | G06F 3/0484 715/764 |

* cited by examiner

FIG. 9A

| Page number 901 | Identifier 902 | Coordinates (x, y) 903 | Width and height (w, h) 904 | Attribute 905 | Display order 906 | ... |
|---|---|---|---|---|---|---|
| 1 | ID01 | (X10, Y10) | (W10, H10) | BACKGROUND | 1 | ... |
| 1 | ID02 | (X11, Y11) | (W11, H11) | TEXT·HORIZON | 2 | ... |
| 1 | ID03 | (X12, Y12) | (W12, H12) | TEXT·HORIZON | 3 | ... |
| 1 | ID04 | (X13, Y13) | (W13, H13) | FIG | 4 | ... |
| 1 | ID05 | (X14, Y14) | (W14, H14) | PHOTO | 5 | ... |
| 1 | ID06 | (X15, Y15) | (W15, H15) | TEXT·BULLET | 6 | ... |
| 2 | ID01 | (X21, Y21) | (W21, H21) | ... | 1 | ... |
| ... | ... | ... | ... | ... | ... | ... |

FIG. 9B

| Page number 901 | Identifier 902 | Coordinates (x, y) 903 | Width and height (w, h) 904 | Attribute 905 | Display order 906 | ... |
|---|---|---|---|---|---|---|
| 1 | ID01 | (X10, Y10) | (W10, H10) | BACKGROUND | 1 | ... |
| 1 | ID02 | (X11, Y11) | (W11, H11) | TEXT·HORIZON | 2 | ... |
| 1 | ID03 | (X12, Y12) | (W12, H12) | TEXT·HORIZON | 3 | ... |
| 1 | ID04 | (X13, Y13) | (W13, H13) | FIG | 4 | ... |
| 1 | ID05 | (X14, Y14) | (W14, H14) | PHOTO | 6 | ... |
| 1 | ID06 | (X15, Y15) | (W15, H15) | TEXT·BULLET | 7 | ... |
| 1 | ID07 | (X16, Y16) | (W16, H16) | MANUAL | 5 | ... |
| 2 | ID01 | (X21, Y21) | (W21, H21) | ... | ... | ... |
| ... | ... | ... | ... | ... | ... | ... |

FIG. 15

| Page number 901 | Identifier 902 | Coordinates (x, y) 903 | Width and height (w, h) 904 | Attribute 905 | Display order 906 | ... |
|---|---|---|---|---|---|---|
| 1 | ID01 | (X10, Y10) | (W10, H10) | BACKGROUND | 1 | ... |
| 1 | ID02 | (X11, Y11) | (W11, H11) | TEXT·HORIZON | 2 | ... |
| 1 | ID03 | (X12, Y12) | (W12, H12) | TEXT·HORIZON | 3 | ... |
| 1 | ID04 | (X13, Y13) | (W13, H13) | FIG | 4 | ... |
| 1 | ID05 | (X14, Y14) | (W14, H14) | PHOTO | 5 | ... |
| 1 | ID06 | (X15, Y15) | (W15, H15) | TEXT·BULLET | 6 | ... |
| 1 | ID07 | (X17, Y17) | (W17, H17) | MANUAL | 7 | ... |
| 2 | ID01 | (X21, Y21) | (W21, H21) | ... | 1 | ... |
| ... | ... | ... | ... | ... | ... | ... |

FIG. 18A

| Page number 901 | Identifier 902 | Coordinates (x, y) 903 | Width and height (w, h) 904 | Attribute 905 | Display order 906 | Display setting 1807 | ... |
|---|---|---|---|---|---|---|---|
| 1 | ID01 | (X10, Y10) | (W10, H10) | BACKGROUND | 1 | ON | ... |
| 1 | ID02 | (X11, Y11) | (W11, H11) | TEXT·HORIZON | 2 | ON | ... |
| 1 | ID03 | (X12, Y12) | (W12, H12) | TEXT·HORIZON | 3 | ON | ... |
| 1 | ID04 | (X13, Y13) | (W13, H13) | FIG | 4 | ON | ... |
| 1 | ID05 | (X14, Y14) | (W14, H14) | PHOTO | 6 | ON | ... |
| 1 | ID06 | (X15, Y15) | (W15, H15) | TEXT·BULLET | 7 | ON | ... |
| 1 | ID07 | (X16, Y16) | (W16, H16) | MANUAL | 5 | ON | ... |
| 2 | ID01 | (X21, Y21) | (W21, H21) | ... | 1 | ... | ... |
| ... | ... | ... | ... | ... | ... | ... | ... |

FIG. 18B

| Page number 901 | Identifier 902 | Coordinates (x, y) 903 | Width and height (w, h) 904 | Attribute 905 | Display order 906 | Display setting 1807 |
|---|---|---|---|---|---|---|
| 1 | ID01 | (X10, Y10) | (W10, H10) | BACKGROUND | 1 | ON |
| 1 | ID02 | (X11, Y11) | (W11, H11) | TEXT·HORIZON | 2 | OFF |
| 1 | ID03 | (X12, Y12) | (W12, H12) | TEXT·HORIZON | 3 | OFF |
| 1 | ID04 | (X13, Y13) | (W13, H13) | FIG | 4 | ON |
| 1 | ID05 | (X14, Y14) | (W14, H14) | PHOTO | 6 | ON |
| 1 | ID06 | (X15, Y15) | (W15, H15) | TEXT·BULLET | 7 | OFF |
| 1 | ID07 | (X16, Y16) | (W16, H16) | MANUAL | 5 | ON |
| 2 | ID01 | (X21, Y21) | (W21, H21) | ⋮ | 1 | ON |
| ⋮ | ⋮ | ⋮ | ⋮ | ⋮ | ⋮ | ⋮ |

IMAGE DISPLAY APPARATUS, IMAGE DISPLAY METHOD, AND STORAGE MEDIUM

BACKGROUND OF THE INVENTION

Field of the Invention

The present invention relates to an image display apparatus, an image display method, and a storage medium.

Description of the Related Art

Conventionally, when displaying a page image of a document by an image display apparatus, sequentially displaying partial areas of the page image according to document components such as characters or photographs included in the page image is performed. Japanese Patent Laid-Open No. 2013-190870 discloses a data processing apparatus that performs object division processing of an image that is scanned by a multifunction machine or is rendered by a printer driver, and determines the type of objects. In addition, Japanese Patent Laid-Open No. 2013-190870 discloses a method of setting a magnification rate and a display position according to the type of the object, and displaying them on a screen.

However, in the data processing apparatus disclosed in the Japanese Patent Laid-Open No. 2013-190870, when displaying an arbitrary partial area specified by the user upon displaying the partial area of the page image, the partial area cannot be displayed in a respective magnification rate by a simple operation.

SUMMARY OF THE INVENTION

The present invention provides an image display apparatus to enable, when displaying the object included in the page image on a screen, managing the object that is not automatically recognized together with the object that is automatically recognized, and displaying them by a simple operation.

According to an aspect of the present invention, an image display apparatus includes: an automatic recognition unit configured to automatically recognize a plurality of objects included in an image; a management unit configured to manage information related to the automatically recognized object as management information; a display control unit configured to display the object of the image on the screen based on the management information; and a specification unit configured to specify an object included in the image, wherein the management unit adds information related to the object specified by the specification unit to the management information, and the display control unit displays the object of the image based on the management information to which the information related to the specified object is added.

Further features of the present invention will become apparent from the following description of exemplary embodiments with reference to the attached drawings.

BRIEF DESCRIPTION OF THE DRAWINGS

FIGS. 9A and 9B illustrate a management table of the partial areas.

FIG. 15 illustrates the management table of the partial areas.

FIGS. 18A and 18B illustrate the management tables of the partial areas.

DESCRIPTION OF THE EMBODIMENTS (First Embodiment)

Hereinafter, embodiments of the present invention will be described with reference to the drawings.

(Hardware configuration of a mobile terminal)

Figure 1:
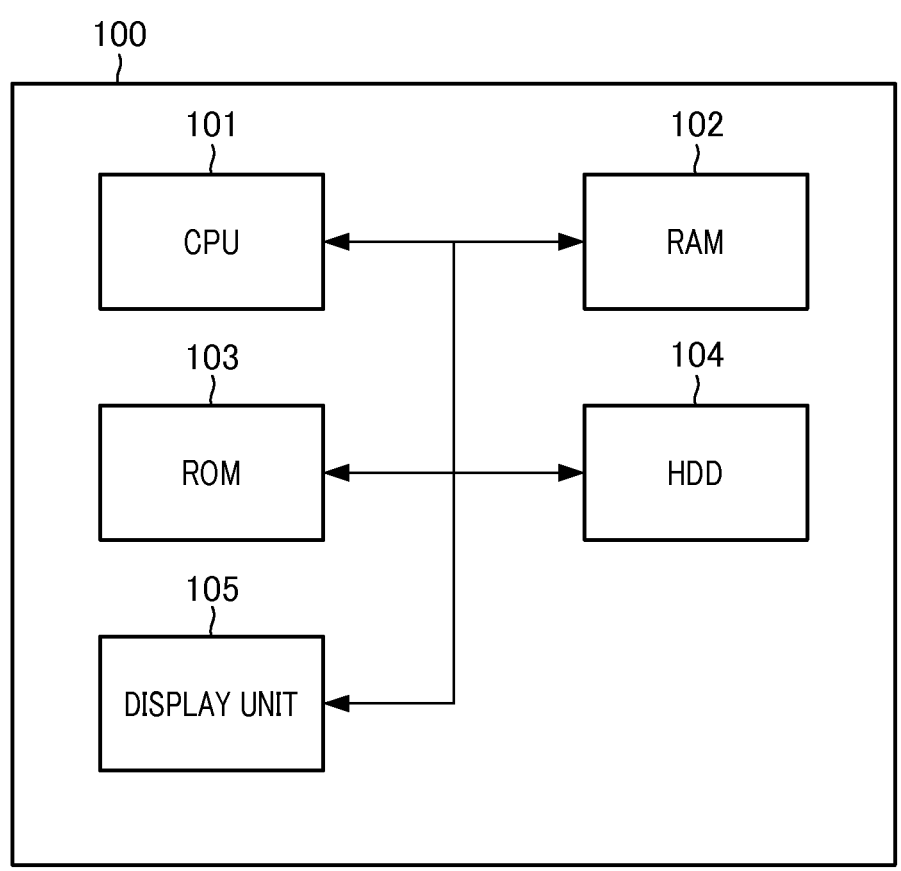
FIG. 1 illustrates an exemplary hardware configuration of a mobile terminal of the present embodiment.

FIG. 1 illustrates an exemplary hardware configuration of a mobile terminal 100 of the present embodiment.

The mobile terminal 100 includes a CPU 101, a RAM 102, a ROM 103, a HDD 104 and a display unit 105. The CPU 101 executes programs stored in the ROM 103 by using the RAM 102 as a working area and controls the operation of respective units of the mobile terminal 100. The RAM 102 is a memory that is allocated for a program executed by the CPU 101. The HDD 104 is a storage device that the program executed by the CPU 101 uses to read and write data. The ROM 103 stores programs executed by the CPU 101 and the like. An image displaying program stored in the ROM 103 is at least one among the programs for controlling the mobile terminal 100. An image processing program is provided by distribution of a storage medium or by download from a network or the like. The display unit 105 displays a page image or the like under the control of the CPU 101. The display unit 105 is, for example, a touch panel or the like and a liquid crystal driving circuit performs liquid crystal driving under the control of the CPU 101 to display the page image or the like on the touch panel. Furthermore, the display unit 105 receives operations from a user. The display unit 105 notifies the CPU 101 about operation content received from the user.

(Processing Block of the Mobile Terminal)

Figure 2A:
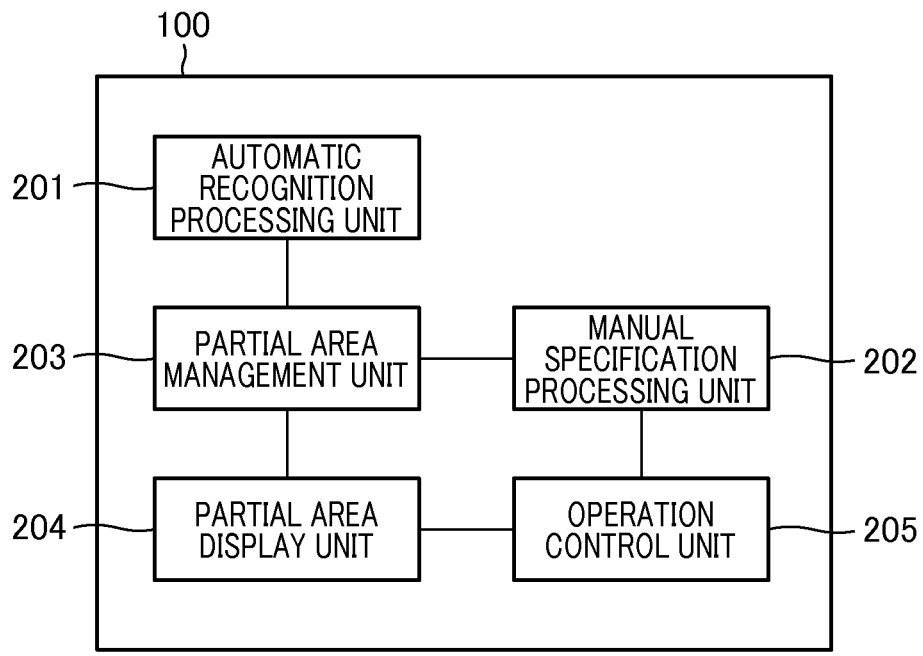
FIGS. 2A and 2B illustrate an example of a processing block of the mobile terminal of the present embodiment

FIG. 2A is an example of a processing block realized by the mobile terminal 100 in the present embodiment.

The processing block realized by the mobile terminal 100 includes an automatic recognition processing unit (automatic recognition unit) 201, a manual specification processing unit (specification unit) 202, a partial area management unit (management unit) 203, a partial area display unit (display control unit) 204, and an operation control unit 205. The mobile terminal 100 executes the programs such as the image displaying program included in the ROM 103 by the CPU 101 to realize these respective processing units 201 to 205 as the processing blocks.

Figure 4:
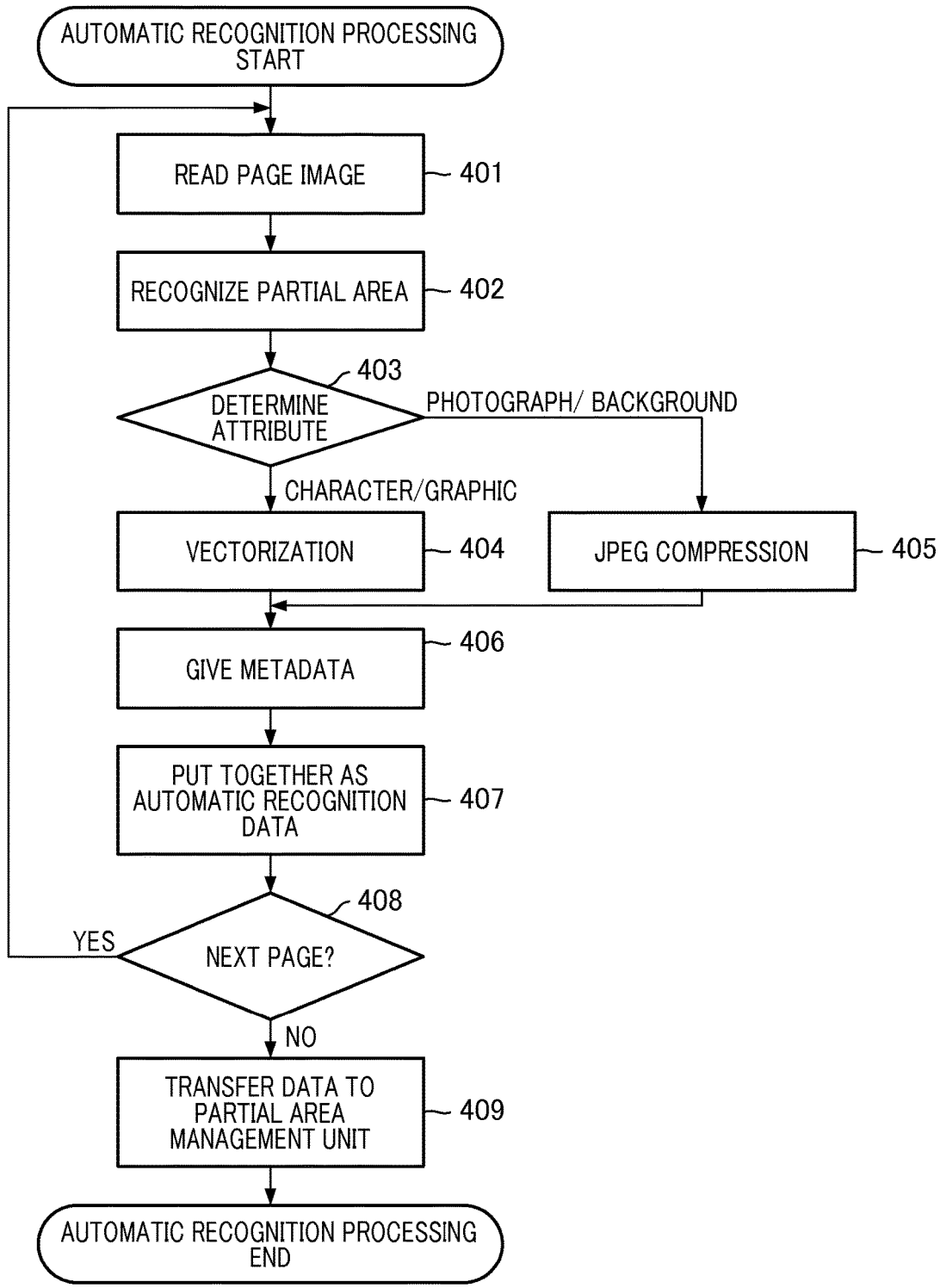
FIG. 4 is a flowchart illustrating an automatic recognition processing of a partial area.

The automatic recognition processing unit 201 automatically recognizes a partial area (object) on the page image. For example, the automatic recognition processing unit 201 automatically recognizes a plurality of the partial areas according to document components such as a text, a figure, a chart, or the like included in the page image. A processing procedure of the automatic recognition of the partial area is illustrated in FIG. 4.

Figure 6:
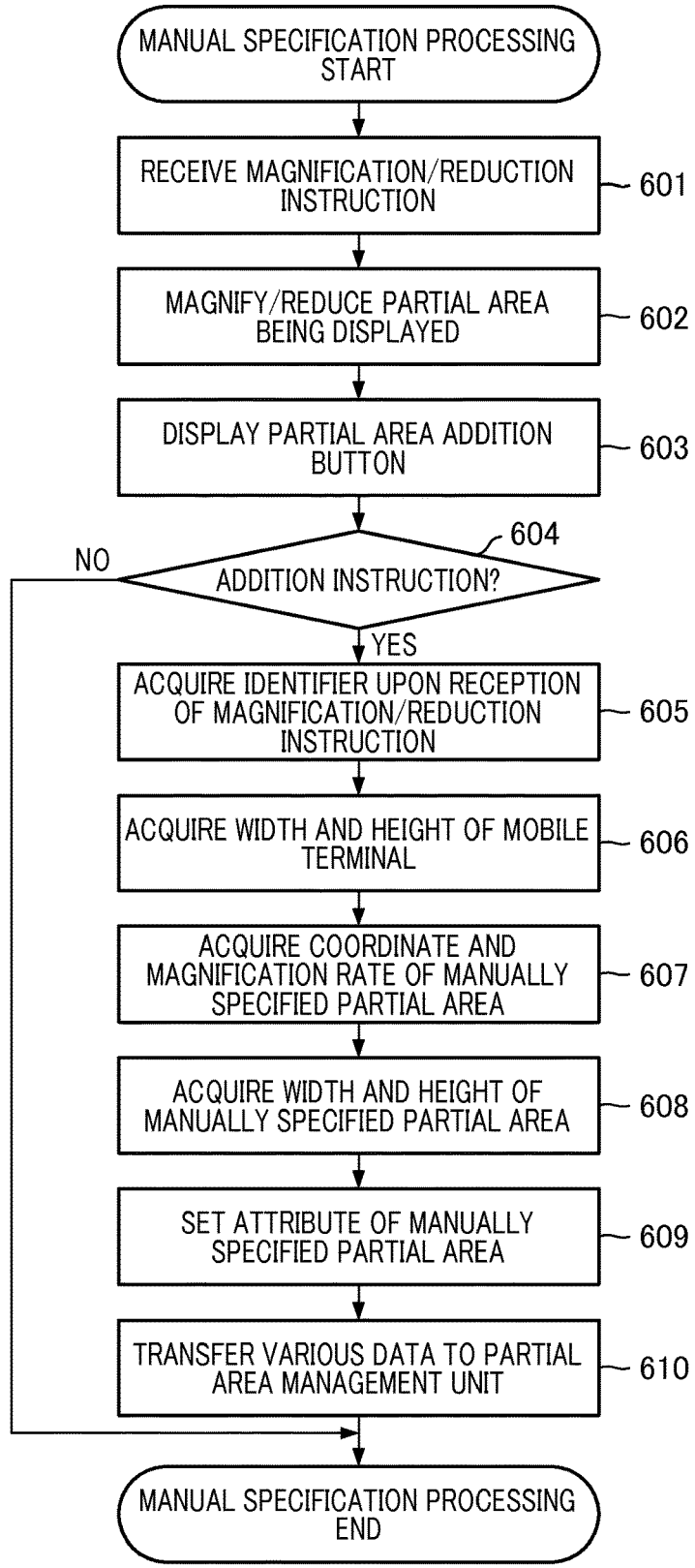
FIG. 6 is a flowchart illustrating manual specification processing of the partial area.

The operation control unit 105 receives an operation instruction from the user and the manual specification processing unit 202 specifies an arbitrary partial area (object) of the page image. For example, the operation control unit 205 receives a magnification/reduction instruction such as pinch-in or pinch-out operation on the page image, and the manual specification processing unit 202 specifies a part of the page image, which is displayed inside the frame of the display unit 105 of the mobile terminal 100, as a partial area. A processing procedure of the manual specification of the partial area is illustrated in FIG. 6.

Figure 8:
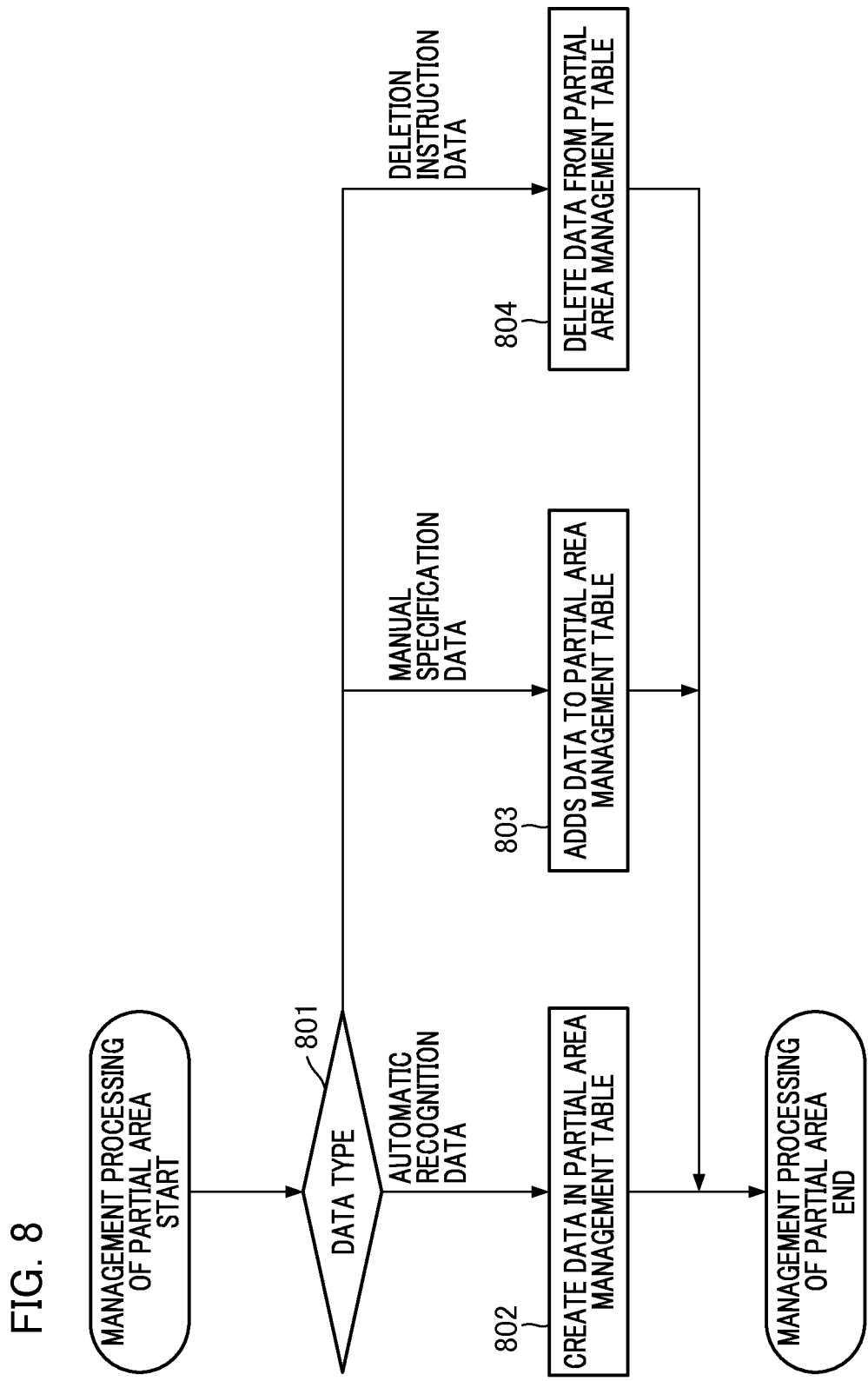
FIG. 8 is a flowchart illustrating management processing of the partial area.

The partial area management unit 203 manages data such as a display position in the page image or display magnification rate or the like for the partial area (object) that is automatically recognized by the automatic recognition processing unit 201 or the partial area (object) that is manually specified by the manual specification processing unit 202. A processing procedure of the partial area management is illustrated in FIG. 8.

Figure 10:
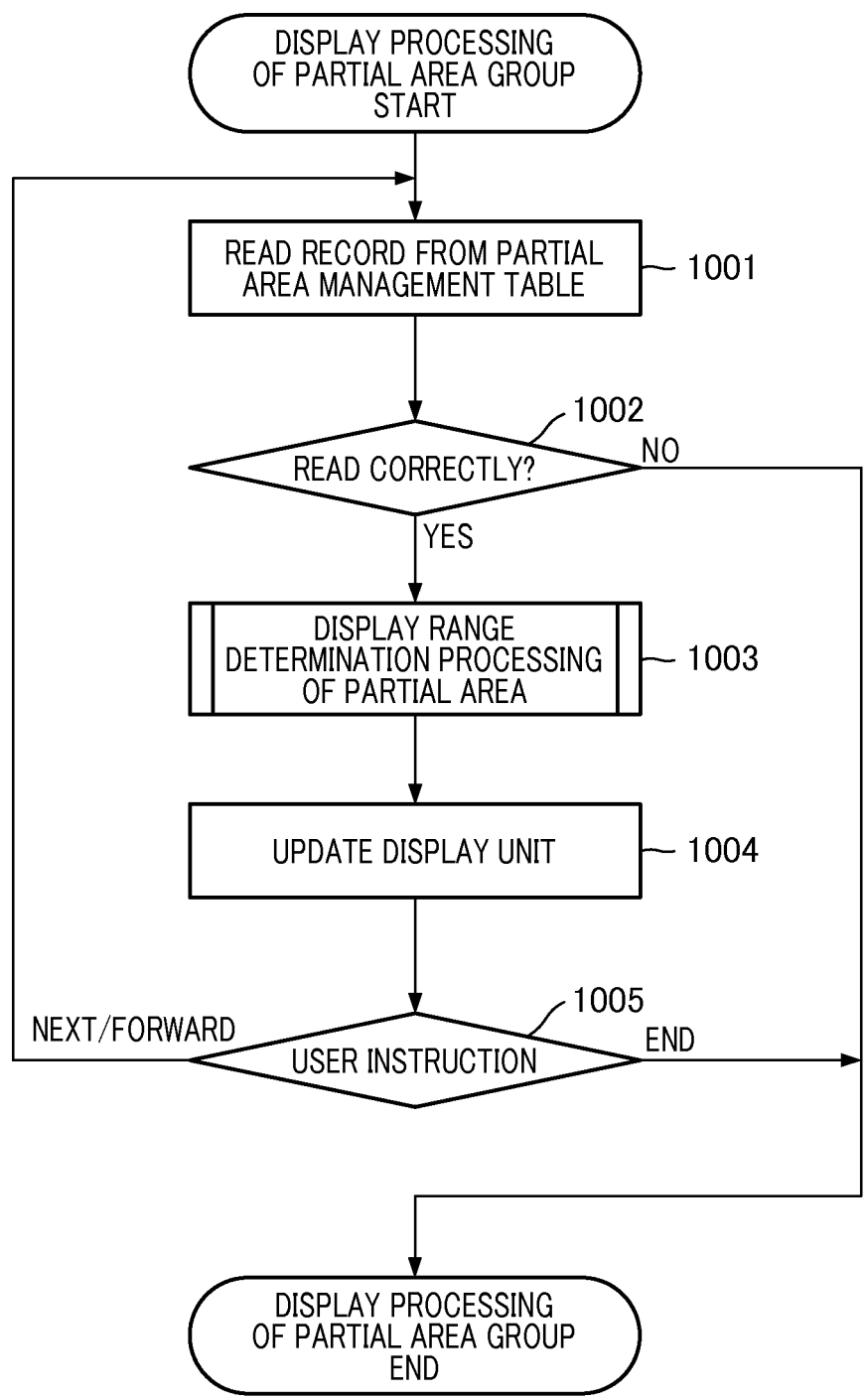
FIG. 10 is a flowchart illustrating a display processing of a partial area group.
Figure 11:
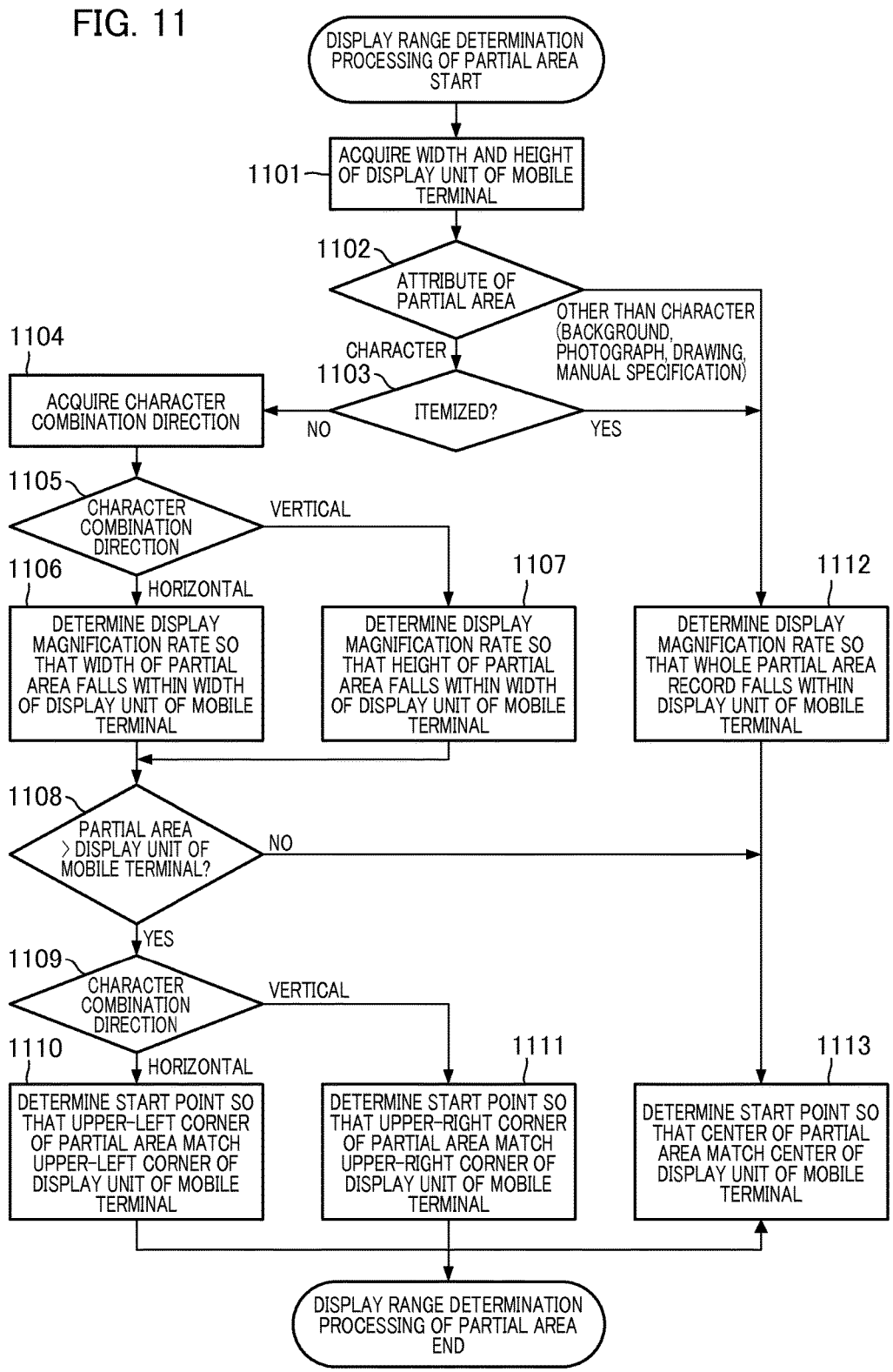
FIG. 11 is a flowchart illustrating display range determination processing of the partial area.

The partial area display unit 204 determines the display magnification rate of the partial area from a coordinate (position) or width and height or the like of the partial area, which is managed by the partial area management unit 203, and displays the page image on the display unit 105 of the mobile terminal by the magnification rate of each of the partial area. A processing procedure of the display processing of the partial area is illustrated in FIGS. 10 and 11.

Figure 3:
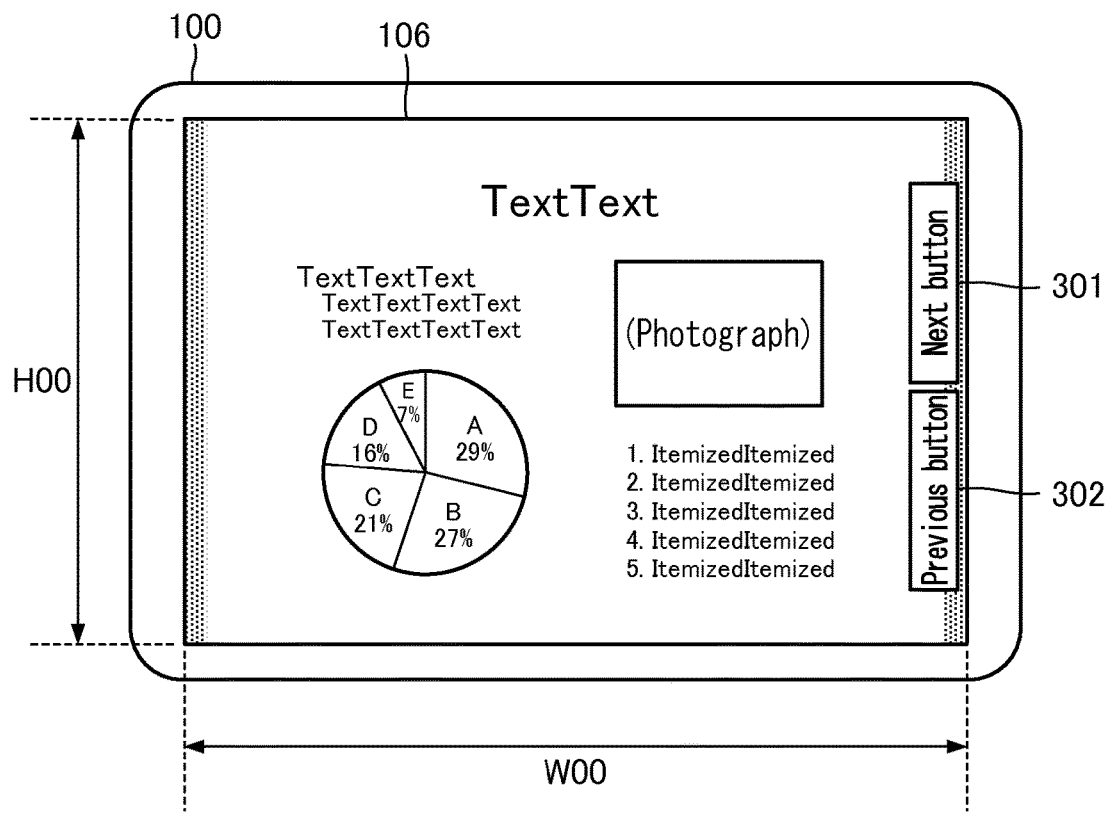
FIG. 3 illustrates a display unit of the mobile terminal of the present invention.

The partial area display unit 204 uses a width and a height of the display unit 105 of the mobile terminal when displaying the partial area. In FIG. 3, the width and the height of the display unit 105 of the mobile terminal is illustrated. In the present embodiment, the width of the display unit 105 of the mobile terminal is W00 and the height is H00. Note that it is possible to rotate the display unit 105 of the mobile terminal by 90 degrees. In that case, the width become H00, and the height become W00.

The partial area display unit 204 uses a "next" button 301 and a "previous" button 302 shown in FIG. 3 when displaying the partial area. A detail is illustrated in a flowchart shown in FIG. 10.

The operation control unit 205 receives the operation from the user on the display unit 105 of the mobile terminal and performs control according to the operation. The kinds of the operation from the user include a tap, swipe, pinch-in, pinch-out, and the like. The operation control unit 205 notifies the manual specification processing unit 202 or the partial area display unit 204 about the kind of the operation, coordinates that are operated or a moving distance, or the like, when receiving the operation. The processing block of the operation control unit is illustrated in FIG. 2B.

Figure 2B:
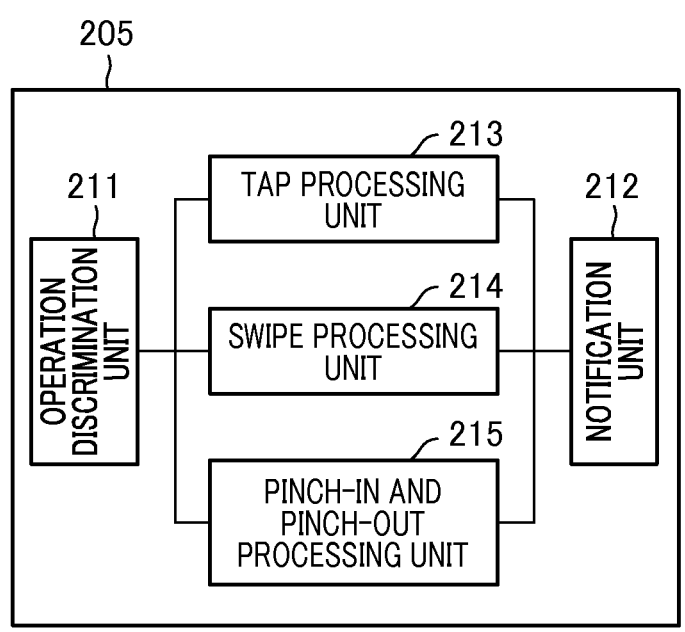

FIG. 2B illustrates the processing block of the operation control unit 205.

The processing block of the operation control unit 205 includes an operation identification unit 211, a notification unit 212, a tap processing unit 213, a swipe processing unit 214, and a pinch-in and pinch-out processing unit 215.

The operation identification unit 211 identifies the kind of the operation when the operation from the user on the display unit 105 of the mobile terminal 100 is received. The kinds of the operation from the user include a tap, swipe, pinch-in, pinch-out, and the like.

The tap processing unit 213 performs processing according to the coordinates that are tapped when the operation identification unit 211 determines that the operation received from the user is the tap operation. The tap processing unit 213 determines whether or not the coordinates that are tapped are inside the one of the buttons (user interface), which are the "next" button 301, the "previous" button 302 that are shown in FIG. 3, an "add" button 701 shown in FIG. 7B, which is a button for adding the partial area, or a "delete" button 702 shown in FIG. 7D which is a button for deleting the partial area.

The operation identification unit 211 notifies the partial area display unit 204 or the manual specification processing unit 202 via the notification unit 212 according to the button that is pressed. This notification event is called a "tap event". The operation identification unit 211 notifies the partial area display unit 204 about the tapped button and the tap event when it is determined that the "next" button 301 or the "previous" button 302 that are shown in FIG. 3, or the "delete" button 702 shown in FIG. 7D has been tapped. The operation identification unit 211 notifies the manual specification processing unit 202 about the tapped button and the tap event when it is determined that the "add" button of the partial area shown in FIG. 7B has been tapped.

The swipe processing unit 214 notifies the manual specification processing unit 202 via the notification unit 212 about a start coordinate of the swipe and the moving distance when the operation identification unit 211 determines that the operation received from the user is the swipe operation. This notification event is called a "swipe event". The manual specification processing unit 202 moves the display range of the partial area being displayed according to the start coordinate of the swipe and the moving distance for which notification is provided by the event, when the swipe event is received.

The pinch-in and pinch-out processing unit 215 notifies the manual specification processing unit 202 via the notification unit 212 about information including the moving distance of the pinch-in or the pinch-out when the operation identification unit 211 determines that the operation received from the user is the pinch-in or pinch-out operation. This notification event is called a "pinch-in and pinch-out event". The manual specification processing unit 202 magnifies or reduces the display of the partial area being displayed according to the moving distance for which notification is by the event, when the pinch-in and pinch-out event has been received.

(Automatic Recognition Processing of the Partial Area)

FIG. 4 is a flowchart illustrating the automatic recognition processing of the partial area on the page image that is performed by the automatic recognition processing unit 201.

Note that the processing procedure of the automatic recognition processing unit 201 is included in the image display program stored in the ROM 103 and is executed by the CPU 101.

In step 401, the automatic recognition processing unit 201 reads the page image stored in the HDD 104 or the like of the mobile terminal. In the present embodiment, the automatic recognition processing unit 201 reads the page image for each page and performs the automatic recognition processing. When there is a plurality of pages of the page images, the processing described in step 407 is repeated for the pages.

In step 402, the automatic recognition processing unit 201 recognizes the partial area according to the document components in the read page image. The document components are, for example, in a page image 500 shown in FIG. 5A, a character area 501, a character area 502, a drawing area 503, a photograph area 504 and a character (itemized) area 505. In addition, FIG. 5B illustrates the partial areas of the page image shown in FIG. 5A, which are automatically recognized according to the document components. In FIG. 5B, the partial areas that are automatically recognized are surrounded by a rectangular dotted lines. The character area 501 is automatically recognized as a partial area 511. Similarly, the character area 502 is automatically recognized as a partial area 512, the drawing area 503 as a partial area 513, the photograph area 504 as a partial area 514, the character (itemized) area 505 as a partial area 515, and a background area 500 as a partial area 510.

The automatic recognition processing unit 201 also determines at this time a display order according to the position or the like of the partial areas. In the example shown in FIG. 5B, the display order of the partial area 510 is set to 1, the display order of the partial area 511 is set to 2, the display order of the partial area 512 is set to 3, the display order of the partial area 513 is set to 4, the display order of the partial area 514 is set to 5, and the display order of the partial area 515 is set to 6.

The partial area 510 with the background attribute in the present embodiment is an area that has a same range with the whole page image read from the storage area in step 401. The coordinate of the respective partial areas that are automatically recognized, which is to be described below, represents the position in the partial area 510 with the background attribute.

In step 403, the automatic recognition processing unit 201 determines the types of the attributes (character, photograph, graphic, background) of the respective partial areas, and executes processing according to the attributes. The types of the attributes are a character (vertical writing and horizontal writing), a photograph, a graphic (a drawing, a line drawing, a chart, a line), a background, or the like. The automatic recognition processing unit 201 proceeds to step 405 when the attribute of the partial area is a photograph or a background, and proceeds to step 404 when the attribute of the partial area is a character or a graphic.

In step 404, the automatic recognition processing unit 201 converts image information belonging to the partial area that is determined as a character or a graphic to vector data.

In step 405, the automatic recognition processing unit 201 performs image processing such as JPEG compression to the page image and generates image data.

In step 406, the automatic recognition processing unit 201 appends metadata to each of the partial areas. The metadata includes the attribute of the partial area, the display order, the coordinate, the width and the height, and the like.

The description will be given of the coordinate (position) and the width and the height (size) of the partial area in the page image by using the partial area 513 shown in FIG. 5C. With respect to the coordinates, the upper-left corner of the partial area 510 with the background attribute (a same area with the whole page image) is taken as the origin. The coordinate of the partial area 513 is represented by a distance X4, which is a distance from the origin to upper-left corner of the partial area 513 in a x-axis direction, and a distance Y4, which is a distance from the origin to upper-left corner of the partial area 513 in a y-axis direction. With respect to the width and the height, they are represented by a length W4 of the partial area 513 in the x-axis direction and the length H4 in the y-axis direction. With respect to each of the other partial areas, the coordinate and the width and the height are similarly represented.

In step 407, the automatic recognition processing unit 201 puts the metadata of the respective partial area acquired in the front step and the image data together into a single file (archiving). The data put together into a single file is called automatic recognition data of the partial area.

In step 408, the automatic recognition processing unit 201 confirms whether there is a page image of a next page. The automatic recognition processing unit 201 returns to step 401 when there is the page image of the next page, and performs the same processing to the page image of the next page. The automatic recognition processing unit 201 proceeds to step 409 when there is no page image of the next page.

In step 409, the automatic recognition processing unit 201 transfers the automatic recognition data of the partial areas on which the processing has been performed to the page image of all pages, and ends the automatic recognition processing.

(Manual Specification Processing of the Partial Area)

FIG. 6 is a flowchart illustrating the manual specification processing of the partial area that is performed by the manual specification processing unit 202.

Note that the processing procedure of the manual specification processing unit 202 is included in the image display program stored in the ROM 103 and is executed by the CPU 101.

In step 601, the manual specification processing unit 202 receives the pinch-in and the pinch-out event via the operation control unit 205. The pinch-in and the pinch out events are events about which the operation control unit 205 provides notification when the display unit 105 of the mobile terminal receives the magnification/reduction instruction such as pinch-in or pinch-out operation or the like from the user as described in FIG. 2B.

In step 602, the manual specification processing unit 202 performs magnification/reduction processing on the partial area being displayed on the display unit 105 according to the moving distance about which notification has been provided in the pinch-in and the pinch-out event. For example, when the pinch-in or the pinch-out event is received via the operation control unit 205 while displaying FIG. 7A on the display unit 105 of the mobile terminal, the manual specification processing unit 202 magnifies and displays the partial area being displayed according to the moving distance as shown in FIG. 7B.

Figure 7A:
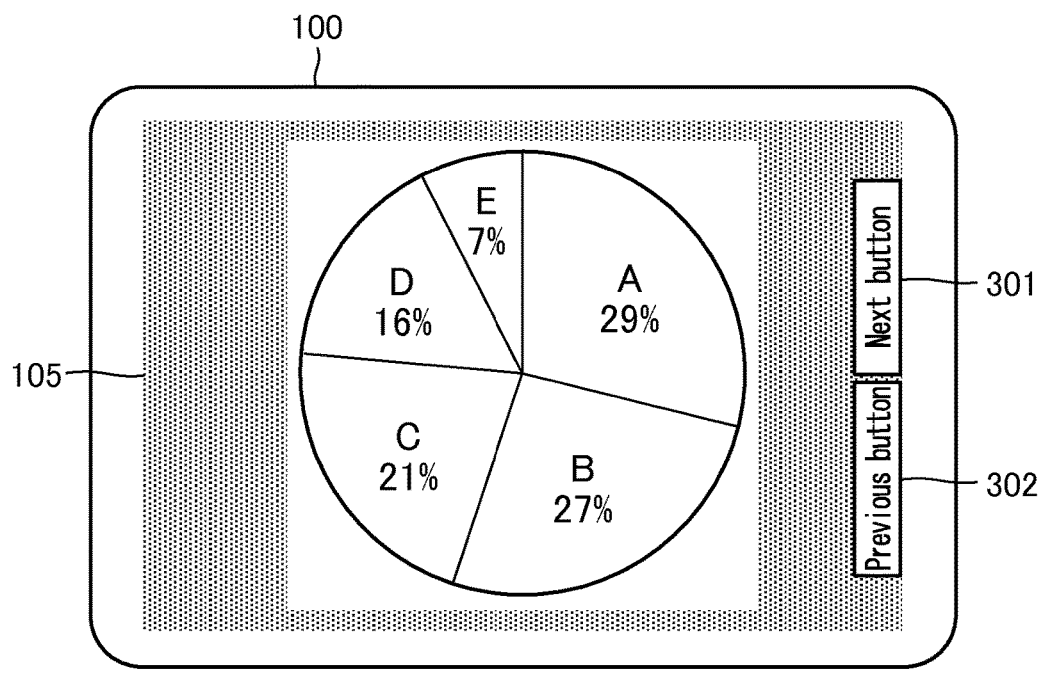
FIGS. 7A to 7D illustrate screens during a manual specification and during a deletion instruction.
Figure 7B:
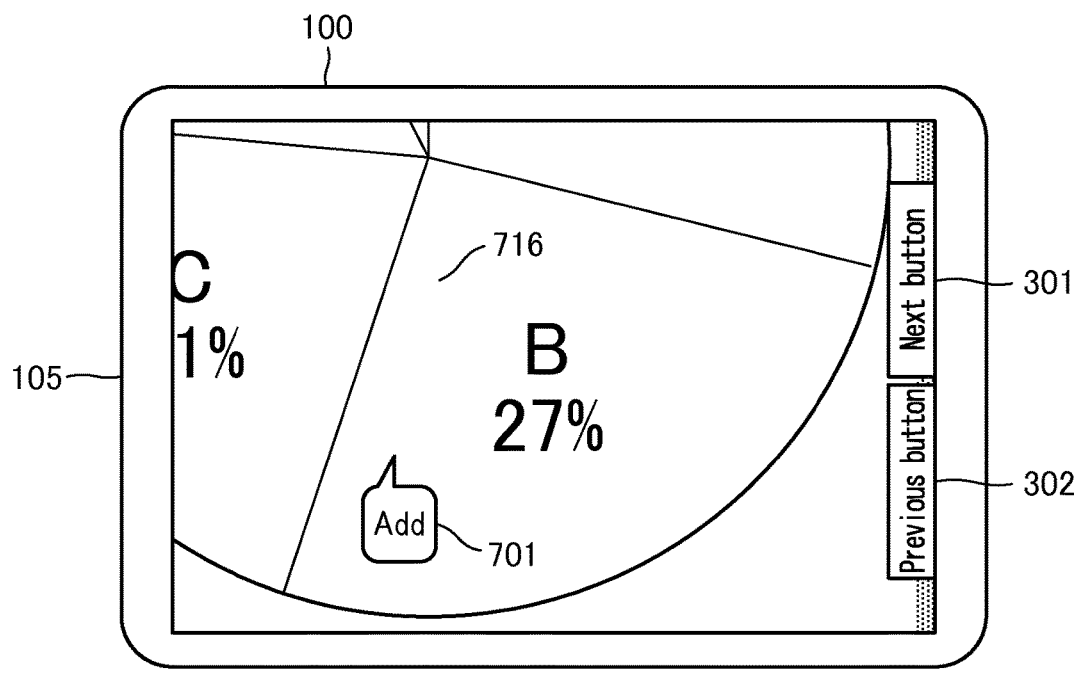

In step 603, the manual specification processing unit 202 displays the "add" button 701 shown in FIG. 7B to add the partial area, when the notification about the pinch-in and the pinch-out event from the operation control unit 205 ends. Note that the timing of displaying the adding button of the partial area may be after the notification about the pinch-in and the pinch-out events from the operation control unit 205 ends and further after receiving a long tap event from the operation control unit 205.

In step 604, the manual specification processing unit 202 determines whether or not the tap event on the "add" button 701 of the partial area is received via the operation control unit 205. When the tap event on the "add" button 701 of the partial area is received, the manual specification processing unit 202 proceeds to step 605 for receiving the addition instruction for the partial area. When the tap event on the "add" button 701 of the partial area is not received, the manual specification processing unit 202 ends the manual specification processing of the partial area.

In step 605, the manual specification processing unit 202 acquires a page number and an identifier of the partial area that has been displayed during the pinch-in and the pinch-out event is received in step 601. The page number and the identifier are data for uniquely identifying the partial area and the description thereof are described by using the management table of the partial area shown in FIGS. 9A and 9B.

In step 606, the manual specification processing unit 202 acquires the width and the height of the display unit 105 of the mobile terminal during reception of the tap event on the "add" button 701 of the partial area. As shown in FIG. 3, the width and the height of the display unit 105 of the mobile terminal 100 is (W00, H00).

In step 607, the manual specification processing unit 202 acquires the coordinates and the display magnification rate of the area being displayed on the display unit 105 of the mobile terminal 100. The description will be given of the coordinates and the display magnification rate of the area being displayed by using FIGS. 7B and 7C. The display range being displayed on the display unit 105 of the mobile terminal 100 shown in FIG. 7B corresponds to the partial area 716 shown in FIG. 7C.

Figure 7C:
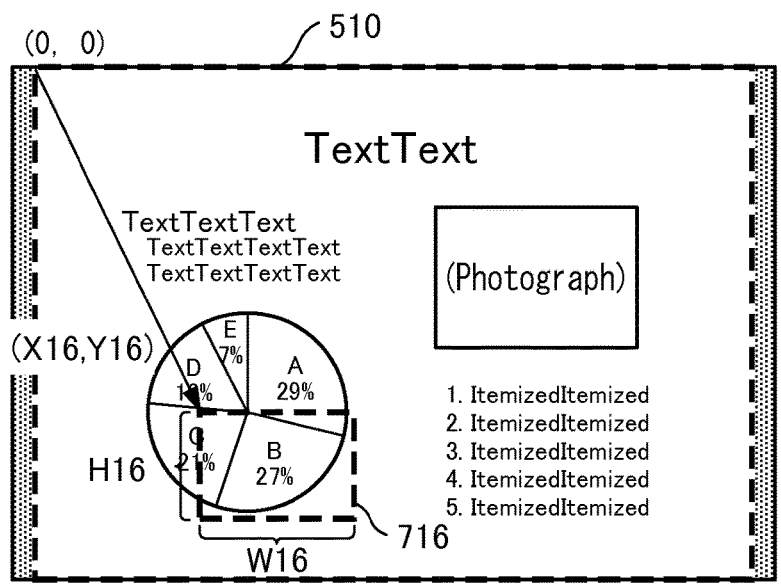

With respect to the coordinates of the partial area 716 shown in FIG. 7C, similar to the automatic recognition processing, the upper-left corner of the partial area 510 with the background attribute is taken as the origin, and a distance X16 and a distance Y16, which are the distance from the origin to the coordinate of the upper-left corner of the partial area 716 in a x-axis direction and a y-axis direction, are acquired. Additionally, with respect to the magnification rate, a magnification rate M16 of the partial area 716 to the partial area 510 with the background attribute is acquired from the moving distance of the pinch-in and the pinch-out or the like, for which notification is provided in the pinch-in and the pinch-out event.

In step 608, the manual specification processing unit 202 acquires a width W16 in a x-axis direction and a height H16 in a y-axis direction of the partial area 716 shown in FIG. 7C by the magnification rate M16 of the partial area 716 and the width and the height (W00, H00) of the display unit of the mobile terminal, which are acquired in the previous step. In this case, the width W16 of the partial area 716 is acquired as W00/M16 (a quotient upon division of W00 by M16) and the height H16 is acquired as H00/M16 (a quotient upon division of H00 by M16).

In the processing hitherto, the manual specification processing unit 202 acquires (X16, Y16) as the coordinates and (W16, H16) as the width and the height of the partial area 716 being displayed on the display unit 105 of the mobile terminal 100 when the addition instruction of the partial area is received.

In step 609, the manual specification processing unit 202 sets manual specification as an attribute of the partial area that is manually specified.

In step 610, the manual specification processing unit 202 puts the coordinates, the width and the height, the attributes, the page number, and the identifier, which are acquired by the previous step, together into manual specification data of the partial area, and transfers the manual specification data to the partial area management unit 203. When step S609 is completed, the manual specification processing unit 202 ends the manual specification preprocess.

In the present embodiment, an arbitrary area that is not automatically recognized can be specified, and the coordinate or the magnification rate of the specified partial can be easily acquired by the aforementioned manual specification processing of the partial area.

(Management Processing of the Partial Area)

FIG. 8 is a flowchart illustrating processing in which the partial area management unit 203 manages the partial area. Furthermore, FIGS. 9A and 9B illustrate a partial area management table that the partial area management unit 203 uses for managing the partial areas.

Note that the processing procedure of the partial area management unit 203 is included in the image display program stored in the ROM 103, and is executed by the CPU 101. The management table of the partial area is stored in the storage area of the RAM 102, the HDD 104, or the like of the mobile terminal.

In step 801, the partial area management unit 203 determines whether the received data is the automatic recognition data of the partial area, the manual specification data of the partial area, or deletion instruction data. The partial area management unit 203 proceeds to step 802 when the automatic recognition data is received, proceeds to step 803 when the manual specification data is received, and proceeds to step 804 when the deletion instruction data is received.

Note that the automatic recognition data of the partial area is the data about which notification has been provided after the automatic recognition processing of the partial area, which is described in FIG. 4. The manual specification data of the partial area is the data about which notification has been provided after the "add" button 701 of the partial area has been tapped, which is described in FIG. 7B. The deletion instruction data is the data about which notification has been provided after the "deletion" button 702 of the partial has been tapped, which is described in FIG. 7D below.

Firstly, the description will be given of the processing when the partial area management unit 203 receives the automatic recognition data of the partial area.

In step 802, the partial area management unit 203 extracts the metadata (the coordinates, the width and the height, the attribute, the page number, the display order, and the like) and the image data as information of the respective partial area from the received automatic recognition data of the partial area, and then stores the extracted data to the partial area management table (management information) shown in FIGS. 9A and 9B. An example of the partial area management table in which the received automatic recognition data of the partial area has been stored is shown in FIG. 9A.

In the column direction of the partial area management table shown in FIG. 9A, each of the partial area records is arranged. One partial area data included in one row is called a partial area record.

For example, in the case of the automatic recognition data in which the automatic recognition processing has been performed on the page image shown in FIG. 5B, since 6 partial areas 510 to 516 are included, 6 partial area records, of which the identifiers are ID01 to ID06, are stored when the partial area management unit 203 stores them to the partial area table.

In the partial area management table shown in FIG. 9A, data items are arranged in the row direction. The data items include a page number 901, an identifier of the partial area 902, a coordinate 903, a width and a height 904, an attribute 905, and a display order 906. The description will be given of these respective items below.

As the page number 901, the page number included in the received automatic recognition data is stored. The identifier 902 is data for identifying the partial area that is automatically recognized in one page, and it is appended when the partial area management unit 203 receives the automatic recognition data and stores the data to the partial area management table. The page number and the identifier enable uniquely identifying the partial area records.

As the coordinates 903, the XY coordinates of the partial area included in the received automatic recognition data are stored. As the width and the heights 904, the width and the height of the partial area included in the automatic recognition data are stored.

As the attribute 905, the attribute of the partial area included in the received automatic recognition data is stored. The types of the attributes are a character (vertical writing or horizontal writing), a photograph, a graphic (a drawing, a line drawing, a chart, a line, or the like), a background, a manual specification, or the like.

As the display order 906, the display order included in the received automatic recognition data is stored.

When the partial area management unit 203 receives the automatic recognition data of the partial area, the partial area management unit 203 stores various data to the partial area management table as shown above and ends the management processing of the partial area.

Next, a description will be given of the processing when the partial area management unit 203 receives the manual specification data of the partial area.

In step 803, the partial area management unit 203 acquires data (the coordinates, the width and the height, the attribute, the page number, the identifier) related to the partial area included in the manual specification data, and adds them to the partial area management table shown in FIG. 9A as the partial area record.

The partial area table shown in FIG. 9B is a table in which a record of the partial area, which is manually specified as shown in FIGS. 7B and 7C, is added to the partial area management table shown in FIG. 9A. Note that the manually specified partial area record is added to the 7th record shown in FIG. 9B.

When the partial area management unit 203 receives the manually specified partial area data, the partial area management unit 203 searches a partial area record that has the page number included in the manually specified partial area data from the partial area management table. Then the partial area management unit 203 adds the received manually specified partial area data after the partial area record that has the last identifier with the corresponding page number. In this example, since the page number included in the received manual specification data of the partial area is 1, the partial area record is added after the record that has the last identifier, which is ID06, of the page number 1 as having ID07.

The partial area management unit 203 adds the data to each of the items of the partial area management table as below.

With respect to the page number 901, the page number included in the manually specified partial area data is added. In this example, page number 1 is added. With respect to the identifier 902, as described above, ID07 is added.

With respect to the coordinates 903 and the width and the height 904, the coordinates and the width and the height included in the manually specified partial area data are added. These values are acquired in step 607 and 608 of the manual specification processing shown in FIG. 6. For Example, in the case of the partial area 716, which is manually specified in FIGS. 7B and 7C, the coordinates are (X16, Y16) and the width and the height is (W16, H16).

With respect to the attribute 905, manual specification, which is the value of the attribute included in the manually specified partial area data, is added. This value is set in step 609 of the manual specification processing shown in FIG. 6.

With respect to the display order 906, firstly the partial area record that is designated by the page number and the identifier included in the manual specification data of the partial area is retrieved. Then, the retrieved partial area record is inserted next (immediately after) in the display sequence. This means that the manually specified partial area data will be inserted next in the display order of the original partial area in which the pinch-in and pinch-out operation is started upon manual specification.

For example, in the case of the partial area that is manually specified in FIGS. 7A and 7B, in FIG. 7A, the pinch-in and the pinch-out operation is started in a state in which the partial area of the partial area record for which the page number is 1 and the identifier is IDO4 is displayed. Therefore, in the manual specification data, the page number 1 and the identifier IDO4 are included. Since the display order of the partial area record designated by the page number is 1 and the identifier is ID04, in the partial area management table shown in FIG. 9B is 4, the display order of the partial area which is manually specified is set as the next display number, which is 5. Furthermore, the display order of the partial area records in which the page number is 1 and the display order was 5 or subsequent number, which are the records of the identifier IDO5 to ID06, is shifted back by one each.

When the partial area management unit 203 receives the manually specified partial area data, the partial area management unit 203 adds the various data to each of the item of the partial area management table as shown above and ends the management processing of the partial area.

As described above, in the present embodiment, the data related to the manually specified partial area can be added to the partial area management table that manages the data related to the automatically recognized partial area. In other words, in the present embodiment, the data related to the manually specified partial area can be managed in the same way as the data related to the automatically recognized partial area.

Next, the description will be given of the processing when the partial area management unit 203 receives the deletion instruction data of the partial area.

In step 804, the partial area management unit 203 acquires the data (the page number, the identifier) related to the partial area included in the deletion instruction data and deletes the data from the partial area management table shown in FIGS. 9A and 9B.

For Example, in the state of the partial area management table shown in FIG. 9B, when the deletion instruction, which designates the page number 1 and the identifier ID07, is received, the corresponding partial area record is retrieved and deleted from the partial area management table. The partial area management table shown in FIG. 9A illustrates the partial area management table in which the partial area record of the page number 1 and the identifier ID07 are deleted from the partial area management table show in FIG. 9B.

Note that the aforementioned deletion processing of the partial area can be performed on both a manually specified partial area and an automatically recognized partial area.

(Display Processing of the Partial Area Group)

FIG. 10 is a flowchart illustrating a display processing of a partial area group which is performed by the partial area display unit 204. The partial area group is all partial area records included in one page to be stored in the partial area management table shown in FIGS. 9A and 9B or the like. The display processing of the partial area group is a processing to display the designated partial area in all of the partial area records included in one page in the order of the respective magnification rate of each of the partial areas.

For example, in the partial area management table shown in FIG. 9A, the partial area group of page 1 corresponds to the six partial area records for which the identifiers are ID01 to ID06.

Note that the processing procedure of the partial area display unit 204 is included in the image display program stored in the ROM 103 and is executed by the CPU 101.

In step 1001, the partial area display unit 204 acquires the partial area record from the partial area management table. At first, the partial area record at the top of the page is acquired. For example, in the case of the first page stored in the partial area management table shown in FIG. 9A, the partial area record for which the identifier is ID01 and the display order is 1 is read.

In step 1002, the partial area display unit 204 determines whether or not the data included in the partial area record is read correctly. If the data is correctly read, the processing proceeds to step 1003. If the data is not correctly read, the display processing of the partial area group ends. For example, if the image data is not read, the partial area cannot be displayed, and, therefore the display processing of the partial area group ends.

In step 1003, the partial area display unit 204 follows the step of display range determination processing of the partial area illustrated by a flowchart shown in FIG. 11, and determines the magnification rate and the coordinate of the partial area to be displayed. The description of the flowchart shown in FIG. 11 is given below.

In step 1004, the partial area display unit 204 updates the display state of the display unit 105 of the mobile terminal 100, and displays the partial area based on the coordinates and the magnification rate of the partial area determined in step 1003.

In step 1005, the partial area display unit 204 receives a user instruction. When the tap event on the "next" button 301 or the "previous" button is received from the operation control unit 205, the partial area display unit 204 returns to step 1001, reads the next or the previous partial area record, and determines whether or not the corresponding partial area record is read in step 1002. For example, assume that the tap event to the "next" button or the "previous" button is received when displaying the partial area which is on the first page and the identifier ID is 01 and the display order is 1 (the beginning) in FIG. 9A. When the tap event on the "next" button is received, the partial area display unit 204 reads the partial area record for which the display order is next (2) and the identifier is ID02, and continues the processing. On the other hand, when the tap event to the "previous" button is received, as the partial area display unit 204 has no partial area record to read, the determination result in step 1002 is NO and the display processing of the partial area group ends.

The partial area display unit 204 repeats the above processing and performs the display processing of the partial area group. A screen transition of the display unit 105 of the mobile terminal in the case of performing the display processing of the partial area of the first page on the partial area management table shown in FIG. 9A will be described below with reference to FIG. 13.

(Display Range Determination Processing of the Partial Area)

FIG. 11 is a flowchart illustrating a display range determination processing of the partial area performed by the partial area display unit 204. This processing is the processing performed in step 1003 of the flowchart shown in FIG. 10 illustrating the display processing of the partial area group that is performed by the partial area display unit 204.

Note that the processing shown in FIG. 11 is included in the image display program stored in the ROM 103 and is executed by the CPU 101.

In step 1101, the partial area display unit 204 acquires the width and the height of the display unit 105 of the mobile terminal. As shown in FIG. 3, the width and the height of the display unit 105 of the mobile terminal is (W00, H00).

In step 1102, the partial area display unit 204 determines the attribute included in the partial area record that is read in step 1001 of FIG. 10. If the attribute is the character, the partial area display unit 204 proceeds to step 1103, and if the attribute is the background or the manual specification, the partial area display unit 204 proceeds to step 1112.

In step 1103, the partial area display unit 204 determines whether or not the partial area by which the attribute was the character is itemized. Here, "itemized" is a character string that has a bullet character such as a dot or a numeral in each of the character strings or at the start of a row. If the determination result is false, the partial area display unit 204 proceeds to step 1104 and if the determination result is true, the partial area display unit 204 proceeds to step 1112.

In step 1104, the partial area display unit 204 reads a text typesetting direction included in the read partial area record. In step S1105, the partial area display unit 204 determines the text typesetting direction. If the text typesetting direction is horizontal writing, the partial area display unit 204 proceeds to step S1105, and if the text typesetting direction is vertical writing, the partial area display unit 204 proceeds to step S1107.

In step 1106, as the text typesetting direction of the partial area is horizontal writing, the partial area display unit 204 sets the display magnification rate of the partial area so that the width included in the partial area record that has been read falls within the width of the display unit 105 of the mobile terminal. For example, when the width included in the partial area record is W10 and the width of the display unit of the mobile terminal is W00, the display magnification rate of the partial area is calculated as W00/W10 (a quotient upon division of W00 by W10)

In step 1107, because the text typesetting direction of the partial area is vertical writing, the partial area display unit 204 sets the display magnification rate of the partial area so that the height included in the read partial area record will fall within the height of the display unit 105 of the mobile terminal. For example, when the height included in the partial area record is H10 and the height of the display unit of the mobile terminal is H00, the display magnification rate of the partial area is calculated as H00/H10 (a quotient upon division of H00 by H10).

In step 1108, the partial area display unit 204 determines whether or not the whole partial area that is magnified/reduced by the display magnification rate set in the front step can be displayed in the display unit 105 of the mobile terminal. If the magnified/reduced partial area is bigger than the display unit 105 of the mobile terminal and cannot display the whole partial area, the partial area display unit 204 proceeds to step 1109. In contrast, if the magnified/reduced partial area is smaller than the display unit 105 of the mobile terminal and can display the whole partial area, the partial area display unit 204 proceeds to step 1113.

In step 1109, the partial area display unit 204 cannot display the whole magnified/reduced partial area, since the magnified/reduced partial area is bigger than the display unit 105 of the mobile terminal. Thus, the partial area display unit 204 determines the text typesetting direction of the partial area and, if it is determined that the text typesetting direction is horizontal writing, then proceeds to step 1110 and, if it is determined that the text typesetting direction is vertical writing, then proceeds to step 1111.

In step 1110, since the partial area display unit 204 cannot display the whole partial area in the display unit 105 of the mobile terminal, the partial area display unit 204 sets the display position so that the first line of the horizontal writing of the partial area can be displayed in the display unit 105. For example, the coordinate of the partial area is determined so that the upper-left corner of the partial area matches the upper-left corner of the display unit 105 of the mobile terminal.

In step 1111, since the partial area display unit 204 cannot display the whole partial area in the display unit 105 of the mobile terminal, the partial area display unit 204 sets the display position so that the first line of the vertical writing of the partial area can be displayed in the display unit 105. For example, the coordinate of the partial area is determined so that the upper-right corner of the partial area matches the upper-right corner of the display unit 105 of the mobile terminal.

In step 1112, if the attribute is other than the character (the background, the drawing, the chart, the photograph, the manual specification, or the like), the partial area display unit 204 determines the display magnification rate so that the partial area having the width and the height designated in the partial area record falls within the display unit 105 of the mobile terminal. In this case, in order to make both the width and the height designated in the partial area record fall within the display unit 105, the partial area display unit 204 acquires the respective magnification rate for each of the width and the height, and determines the small value as the display magnification rate. For example, when the width and the height designated in the partial area record is (W10, H10) and the width and the height of the display unit of the mobile terminal is (W00, H00), the magnification rate of the width W00/W10 (a quotient upon division of W00 by W10) is compared to the magnification rate of the height H00/H10 (a quotient upon division of H00 by H10). Then, the smaller value is determined as the display magnification rate of the partial area.

In step 1113, the partial area display unit 204 sets the coordinate of the partial area so that the center of the partial area matches the center of the display unit 105.

As described above, the partial area display unit 204 completes the determination of the display magnification rate and the coordinate of the partial area by the processing of step 1110, step 1111, or step 1113, and proceeds to step 1004 in FIG. 10.

FIGS. 12A to 12F illustrate a screen transition of the display unit 105 of the mobile terminal during the display processing of the partial area group shown in FIG. 10 and the display range determination processing of the partial area shown in FIG. 11 aforementioned above. Here, the description will be given of both cases in which the partial area management table that stores only the automatically recognized partial areas shown in FIG. 9A is read and the partial area management table that the manually specified partial area is added to the automatically recognized partial areas shown in FIG. 9B is read.

(Display Example 1 of the Partial Area Group)

Firstly, a description will be given of the screen transition of the display unit 105 of the mobile terminal 100 when the partial area management table that stores only the automatically recognized partial areas shown in FIG. 9A is read and the display processing of the partial area group shown in FIG. 10 and the display range determination processing of the partial area shown in FIG. 11 are performed.

The screen of the mobile terminal transits in the order of FIG. 12A, FIG. 12B, FIG. 12C, FIG. 12D, FIG. 12E.

The partial area display unit 204 follows the step of the display processing of the partial area group shown in FIG. 10 and in step 1001, reads the record in which the display order of the first page is the top, which the identifier is ID01, from the partial area management table shown in FIG. 9A. Next, in step 1003, the partial area display unit 204 performs the display range determination processing of the partial area. In the display range determination processing of the partial area shown in FIG. 11, since the attribute of the partial area record of ID01 is the background, the partial area display unit 204 executes step 1112 and determines the display magnification rate so that the whole partial area falls within the display unit 105 of the mobile terminal. Furthermore, the partial area display unit 204 executes step 1113 and determines the coordinate of the partial area so that the center of the partial area matches the center of the display unit 105 of the mobile terminal 100. In step 1004 of FIG. 10, according to the determined display magnification rate and the coordinate, the partial area display unit 204 displays the partial area to the display unit 105 of the mobile terminal 100. This display state is shown in FIG. 12A.

Figure 12A:
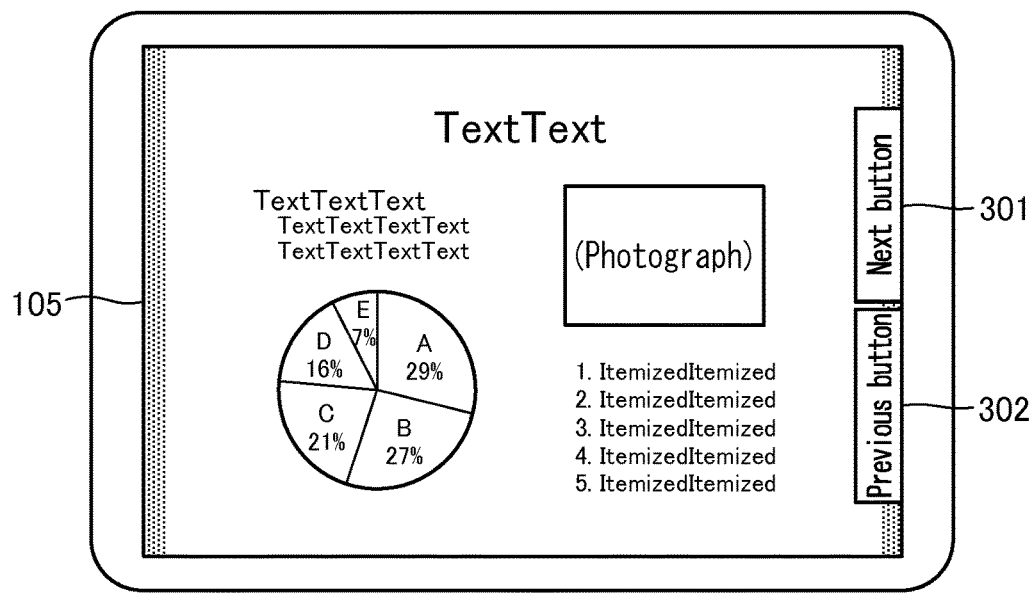
FIGS. 12A to 12F illustrate a screen transition during display processing of the partial area.

When the "next" button 301 is tapped in the display state shown in FIG. 12A (step 1005 in FIG. 10), the partial area display unit 204 reads the next record, of which the display order is 1 and the identifier is ID01, in the partial area management table shown in FIG. 9A. In other words, the partial area record of which the display order is 2, which the identifier is ID02, is read (step 1001 in FIG. 10). In the display range determination processing in FIG. 11, since the attribute of the partial area record of which the identifier is ID02 is the character and horizontal writing, in step 1106 of FIG. 11, the partial area display unit 204 determines the display magnification rate so that the width of the partial area falls within the width of the display unit of the mobile terminal. The width and the height of the partial area of which the identifier is ID02, which is magnified by the determined display magnification rate, is smaller than the width and the height of the display unit 105 of the mobile terminal 100. Therefore, in step 1113, the partial area display unit 204 determines the coordinates of the partial area so that the center of the partial area matches the center of the display unit 105 of the mobile terminal 100. In step 1004 of FIG. 10, the partial area display unit 204 displays the partial area on the display unit 105 of the mobile terminal 100 in accordance with the determined display magnification rate and the coordinate. This display state is shown in FIG. 12B.

Figure 12B:
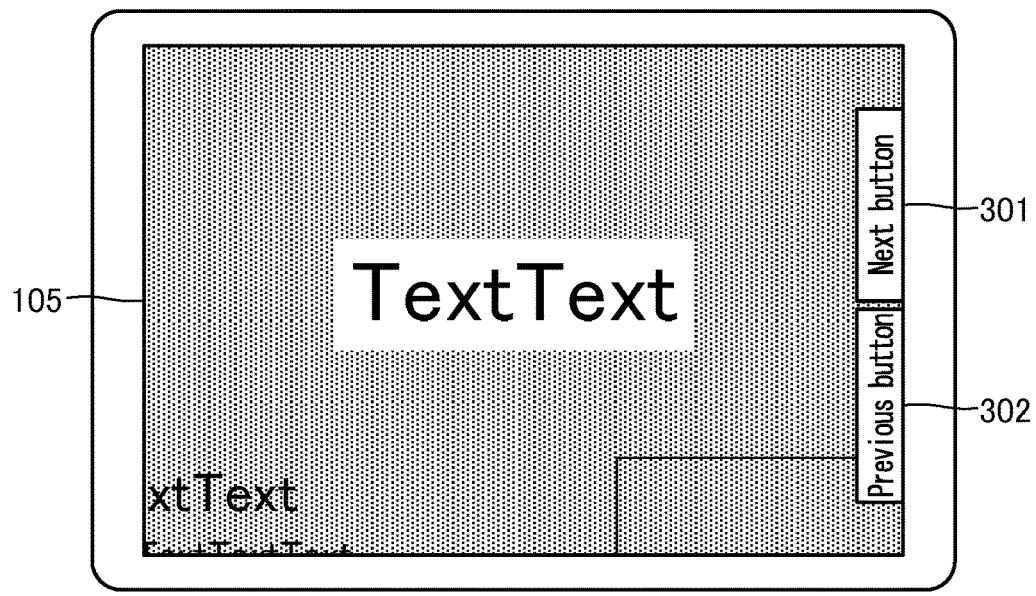

When the "next" button 301 is tapped in the display state shown in FIG. 12B (step 1005 in FIG. 10), the partial area display unit 204 reads the next record, of which the display order is 2 and the identifier is ID02, in the partial area management table shown in FIG. 9A. In other words, the partial area record of which the display order is 3, which the identifier is ID03, is read (step 1001 in FIG. 10). In the display range determination processing in FIG. 11, since the attribute of the partial area record of which the identifier is ID03 is the character and horizontal writing, in step 1106 of FIG. 11, the partial area display unit 204 determines the display magnification rate so that the width of the partial area falls within the width of the display unit 105 of the mobile terminal 100. The width and the height of the partial area of which the identifier is ID03, which is magnified by the determined display magnification rate, is smaller than the width and the height of the display unit 105 of the mobile terminal 100. Therefore, in step 1113, the partial area display unit 204 determines the coordinate of the partial area so that the center of the partial area matches the center of the display unit 105 of the mobile terminal 100. In step 1004 of FIG. 10, the partial area display unit 204 displays the partial area on the display unit 105 of the mobile terminal 100 in accordance with the determined display magnification rate and the coordinate. This display state is shown in FIG. 12C.

Figure 12C:
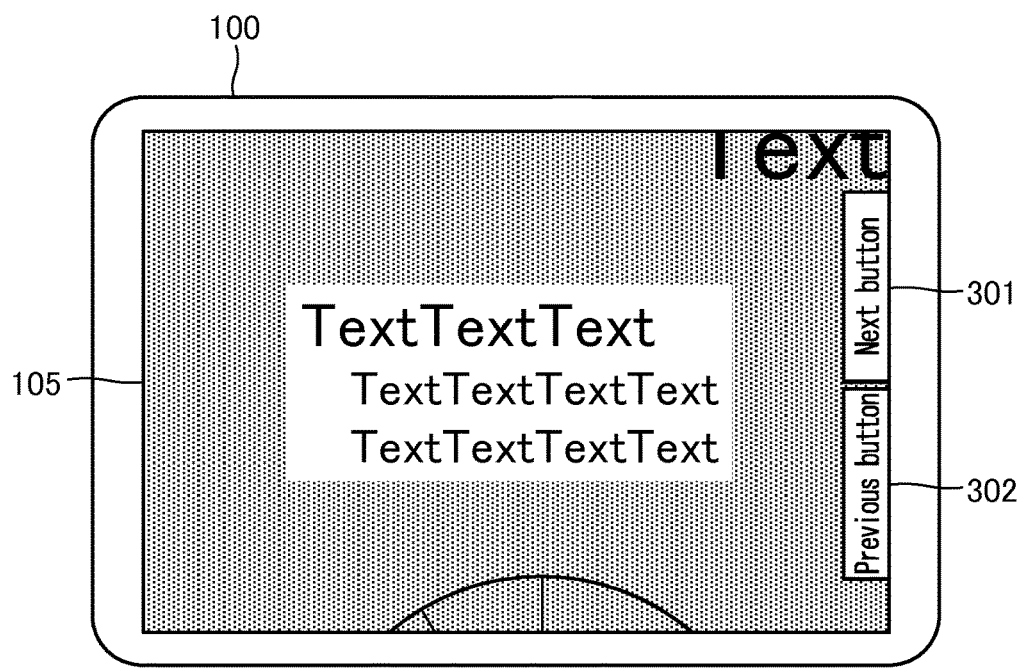

When the "next" button 301 is tapped in the display state shown in FIG. 12C (step 1005 in FIG. 10), the partial area display unit 204 reads the next record, of which the display order is 3 and the identifier is ID03, in the partial area management table shown in FIG. 9A. In other words, the partial area record of which the display order is 4, which the identifier is ID04, is read (step 1001 in FIG. 10). In the display range determination processing in FIG. 11, since the attribute of the partial area record of which the identifier is ID04 is the drawing, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal. In step 1004 of FIG. 10, the partial area display unit 204 displays the partial area on the display unit 105 of the mobile terminal 100 in accordance with the determined display magnification rate and the coordinates. This display state is shown in FIG. 12D.

Figure 12D:
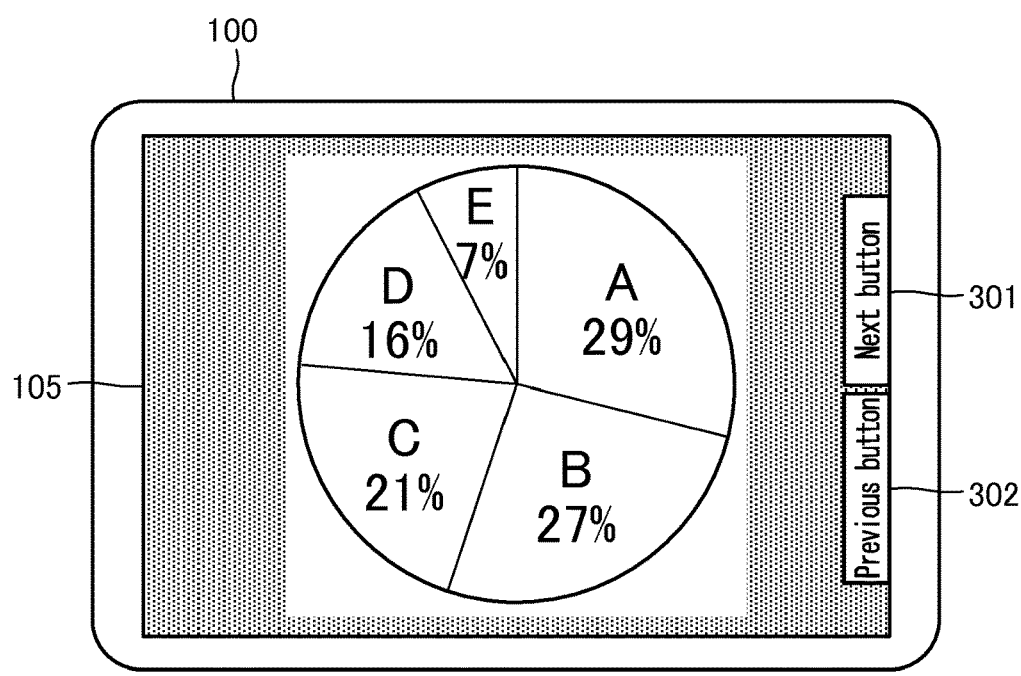
Figure 12E:
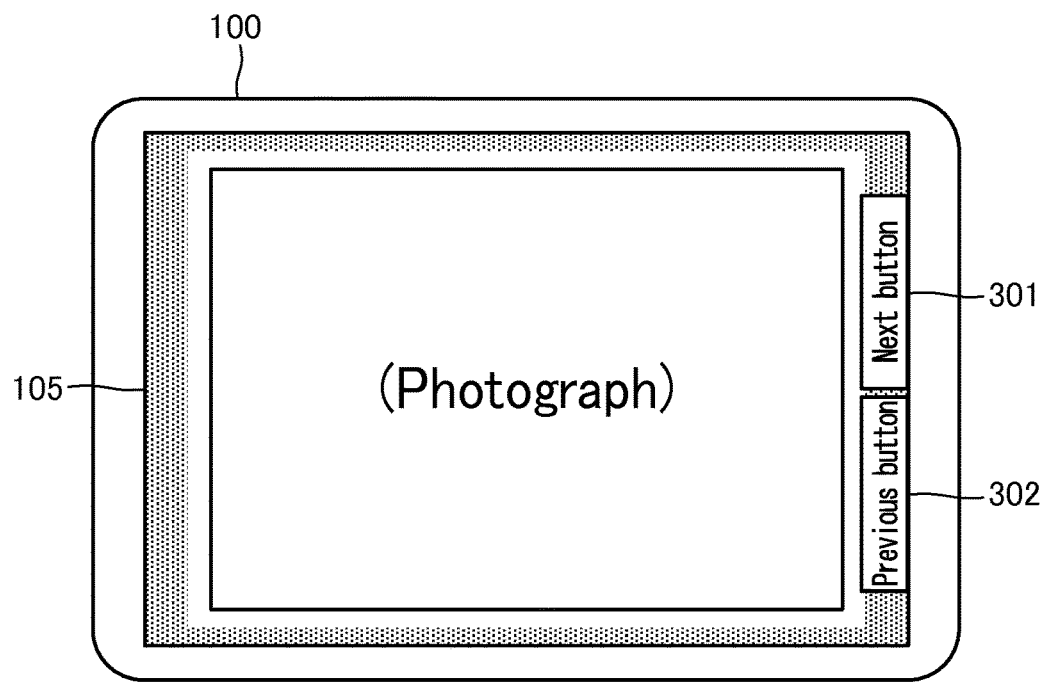

When the "next" button 301 is tapped in the display state shown in FIG. 12D (step 1005 in FIG. 10), the partial area display unit 204 reads the next record, of which the display order is 4 and the identifier is ID04, in the partial area management table shown in FIG. 9A. In other words, the partial area record of which the display order is 5, which the identifier is ID05, is read (step 1001 in FIG. 10). In the display range determination processing in FIG. 11, since the attribute of the partial area record of which the identifier is ID05 is the photograph, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal. In step 1004 of FIG. 10, the partial area display unit 204 displays the partial area on the display unit 105 of the mobile terminal 100 in accordance with the determined display magnification rate and the coordinate. This display state is shown in FIG. 12E.

(Display example 2 of the partial area group)

Next, the description will be given of the screen transition of the display unit 105 of the mobile terminal 100 when the partial area management table to which the manually specified partial area is added to the automatically recognized partial areas shown in FIG. 9B is read and the display processing of the partial area group is performed.

The screen of the mobile terminal 100 transits in the order of FIG. 12A, FIG. 12B, FIG. 12C, FIG. 12D, FIG. 12F, and FIG. 12E.

The partial area management table shown in FIG. 9B has the same records as shown in FIG. 9A, which are records of which the identifiers are IDO1 to ID04. Accordingly, the display processing of the partial area group is the same as described above until the screen transits in the order of FIG. 12A, FIG. 12B, FIG. 12C, and FIG. 12D. Therefore, here, the description will be given of the screen transition after FIG. 12(D).

When the "next" button 301 is tapped in the display state shown in FIG. 12D (step 1005 in FIG. 10), the partial area display unit 204 reads the next record of the record, of which the display order is 4 and the identifier is ID04, in the partial area management table shown in FIG. 9B. In other words, the partial area record of which the display order is 5, which the identifier is ID07, is read (step 1001 in FIG. 10). In the display range determination processing in FIG. 11, since the attribute of the partial area record of which the identifier is ID07 is the manual specification, in step 1112, the partial area display unit 204 determines the display magnification rate so that the whole partial area falls within the display unit 105 of the mobile terminal 100. The partial area display unit 204 executes step 1113 and determines the coordinate of the partial area so that the center of the partial area matches the center of the display unit 105 of the mobile terminal 100. In step 1004 of FIG. 10, the partial area display unit 204 displays the partial area on the display unit 105 of the mobile terminal 100 in accordance with the determined display magnification rate and the coordinate. This display state is shown in FIG. 12F.

Figure 12F:
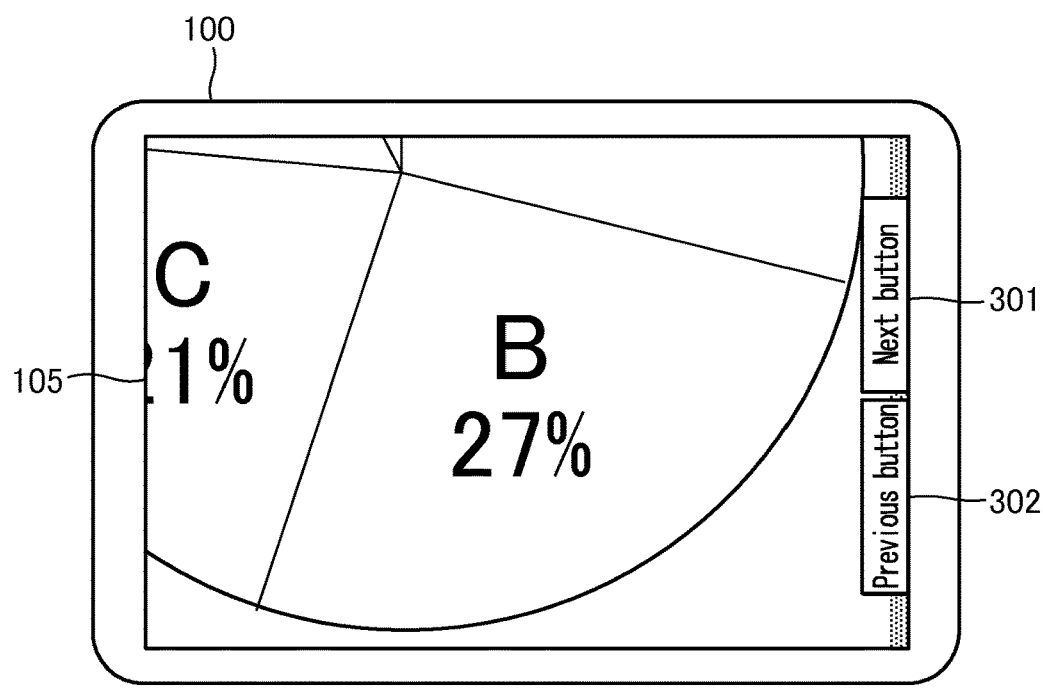

When the "next" button 301 is tapped in the display state shown in FIG. 12F (step 1005 in FIG. 10), the partial area display unit 204 reads the next record, of which the display order is 5 and the identifier is ID07, in the partial area management table shown in FIG. 9B. In other words, the partial area record of which the display order is 6, which the identifier is ID05, is read (step 1001 in FIG. 10). In the display range determination processing in FIG. 11, since the attribute of the partial area record of which the identifier is ID05 is the photograph, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal. In step 1004 of FIG. 10, the partial area display unit 204 displays the partial area on the display unit 105 of the mobile terminal 100 in accordance with the determined display magnification rate and the coordinate. This display state is shown in FIG. 12E.

In the present embodiment, according to the processing described above, both the automatically recognized partial areas and the manually specified partial areas managed by the partial area management table can be displayed by the magnification rate of the respective partial area with a simple operation. For example, by the conventional method, in the case of performing presentation by projecting materials displayed in the mobile terminal, to magnify and display the area, which is not automatically recognized, the user is required to perform time-consuming operation such as the pinch-in and the pinch-out and the like for every time. However, according to the present embodiment, any of the manually specified partial areas can be displayed with the automatically recognized area by a simple operation.

(Deletion Processing of the Partial Area)

Figure 13:
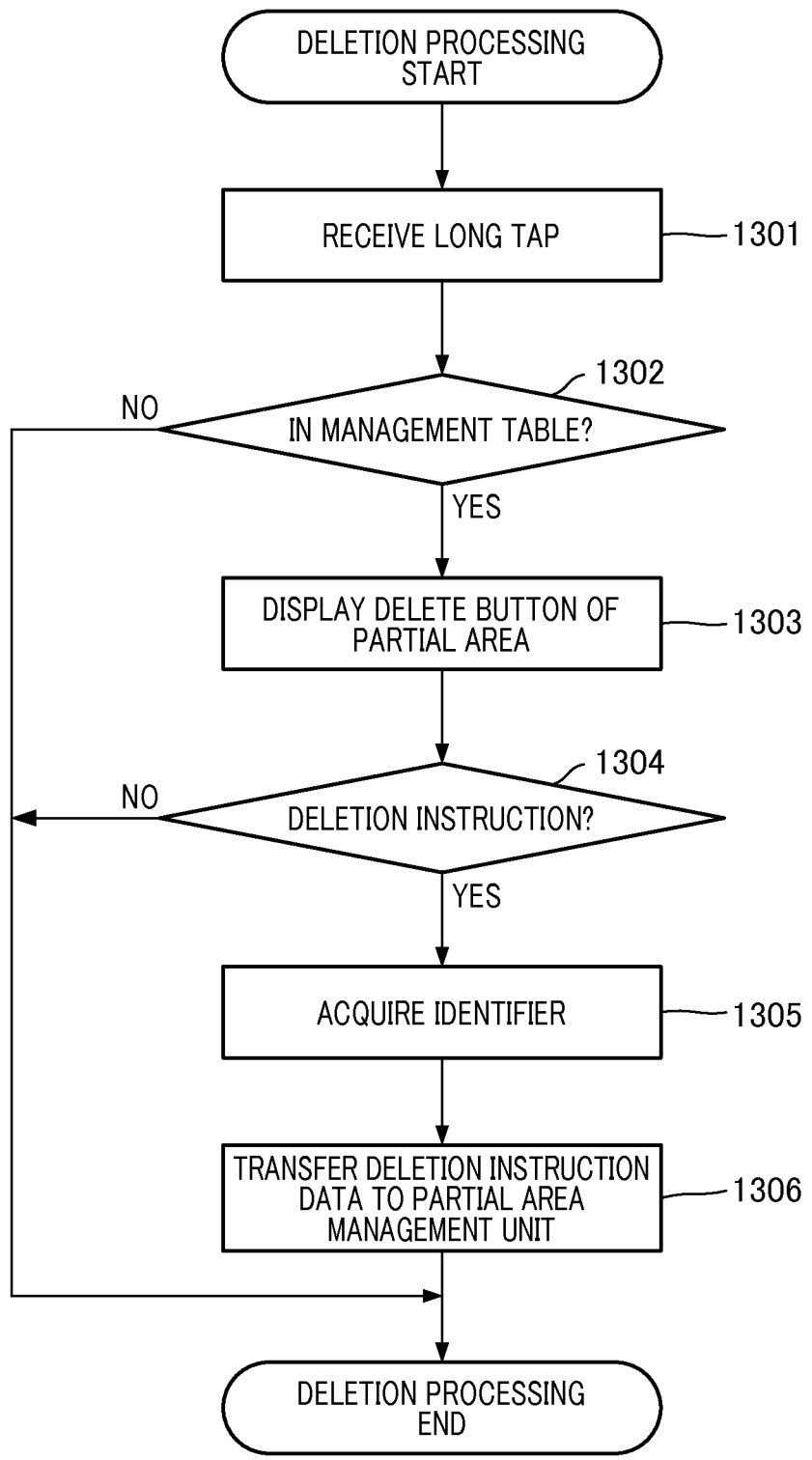
FIG. 13 is a flowchart illustrating a deletion processing of the partial area.

FIG. 13 is a flowchart illustrating deletion processing of the partial area performed by the partial area display unit 204 and the partial area management unit 203.

Note that the processing shown in FIG. 13 is included in the image displaying program stored in the ROM 103 is executed by the CPU 101.

The partial area display unit 204 receives the deletion instruction of the partial area while displaying the partial area, in the display processing of the partial area group shown in FIG. 10 and the display range determination processing of the partial area shown in FIG. 11. Here, as an example, assume that the partial area display unit 204 is displaying the partial area of page 1 of which the identifier is ID05, in accordance with the partial area management table shown in FIG. 9B, and the display unit 105 of the mobile terminal 100 is in a state of FIG. 12F.

In step 1301, if the display unit 105 of the mobile terminal 100 receives a long tap while displaying the partial area shown in FIG. 12F, the partial area display unit 204 receives a long tap event via the operation control unit 205.

In step 1302, when the partial area display unit 204 receives the long tap event, the partial area display unit 204 determines whether or not the partial area being displayed is included in the partial area records stored in the partial area management table. More specifically, the partial area display unit 204 determines whether or not the partial area being displayed is an area that conforms to the coordinates and the width and the height of the partial area records stored in the partial area management table. If the determination result is true, the partial area display unit 204 proceeds to step 1303. If the determination result is false, the partial area display unit 204 ends the deletion processing of the partial area.

Figure 7D:
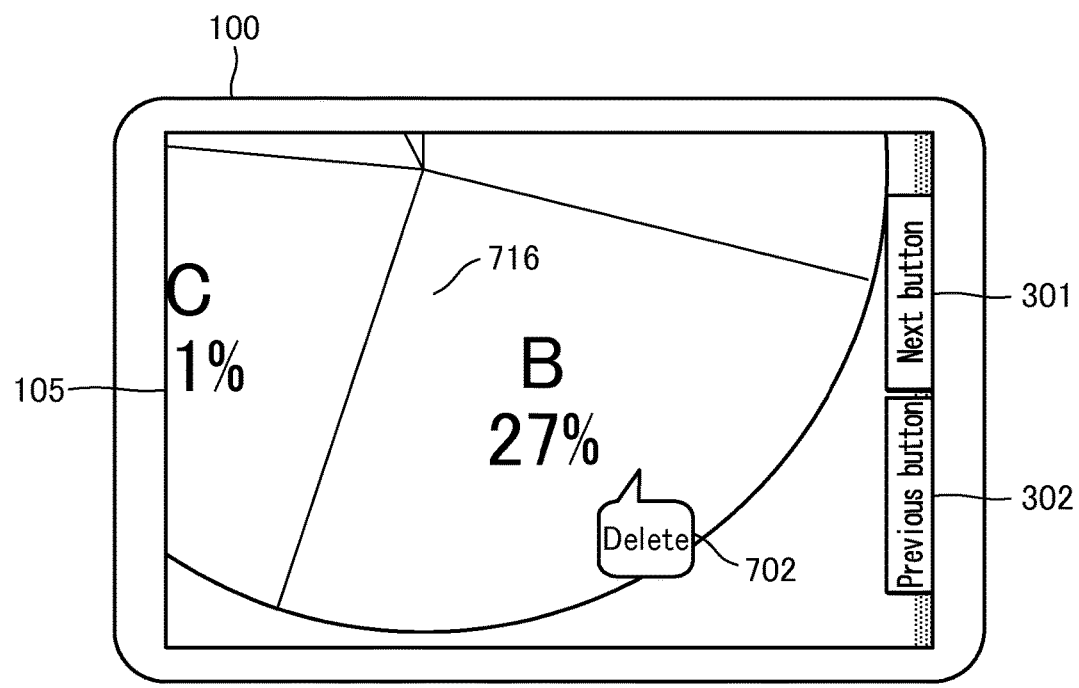

In step 1303, the partial area display unit 204 displays the "delete" button 702 of the partial area shown in FIG. 7D on the display unit 105 of the mobile terminal 100.

In step 1304, the partial area display unit 204 determines whether or not the tap event on the "delete" button 702 of the partial area is received via the operation control unit 205. If the tap event to the "delete" button 702 of the partial area is received, the partial area display unit 204 proceeds to step 1305 in order to receive the deletion instruction of the partial area. If the tap event on the "delete" button 702 of the partial area is not received, the partial area display unit 204 ends the deletion processing of the partial area.

In step 1305, the partial area display unit 204 acquires the page number and the identifier of the partial area being displayed on the display unit 105 of the mobile terminal 100, which is determined by using the partial area management table in step 1302. In this example, the page number and the identifier to be acquired are page number 1 and the identifier ID 05 in the partial area management table shown in FIG. 9B.

In step 1306, the partial area display unit 204 transfers the data (the page number and the identifier) acquired in the front step as the deletion instruction data of the partial area to the partial area management unit 203. The partial area management unit 203 performs the processing in the case of receiving the deletion data of the partial area described in the management processing of the partial area shown in FIG. 8, and deletes the partial area record, of which the page number is 1 and the identifier is ID05, from the partial area management table shown in FIG. 9B.

In the present embodiment, the manually specified partial area can be deleted by the aforementioned deletion processing of the partial area, and thereby adding and deleting the manually specified partial area can be performed by a simple operation. Note that the deletion processing described above is not limited to the manually specified partial area, and can be performed on the automatically recognized partial area.

As described above, according to the present embodiment, an image display apparatus that, when displaying the partial area included in the page image on the screen, can manage the partial area, which is not automatically recognized, together with the automatically recognized partial area and can display the partial areas by a simple operation can be provided.

(Second Embodiment)

Next, a description will be given of the image apparatus according to the second embodiment of the present invention. In the first embodiment, there was one automatically recognized partial area being displayed when manually specifying a partial area, whereas, in the present embodiment, the description will be given of the case of manually specifying an area that includes a plurality of the partial areas.

Figure 14A:
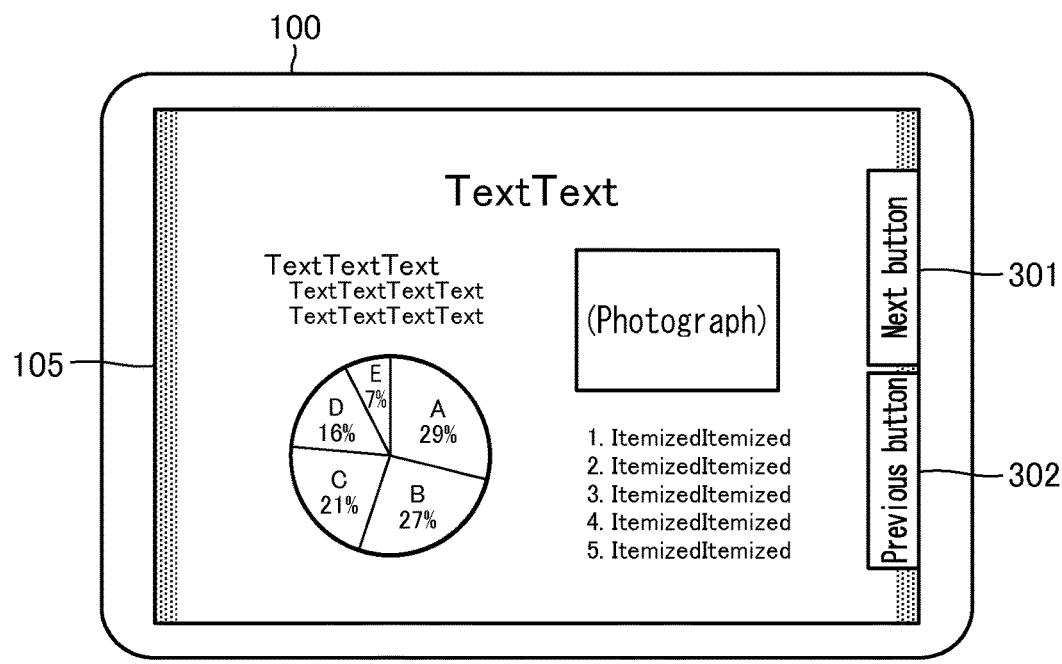
FIGS. 14A to 14C illustrate manual specification processing of the partial area.
Figure 14B:
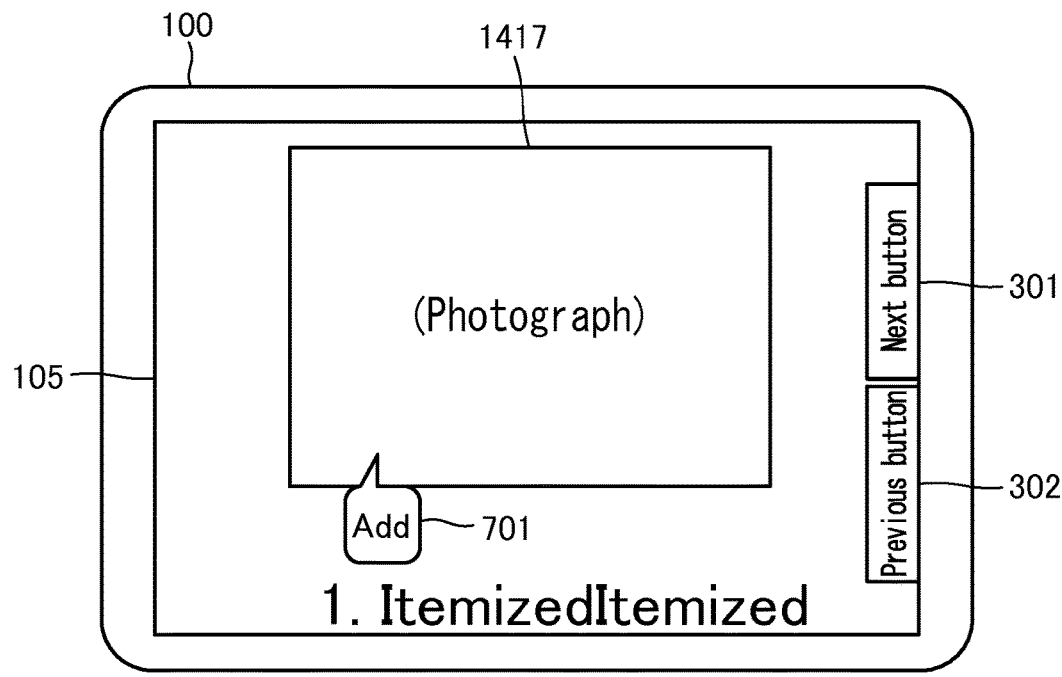
Figure 14C:
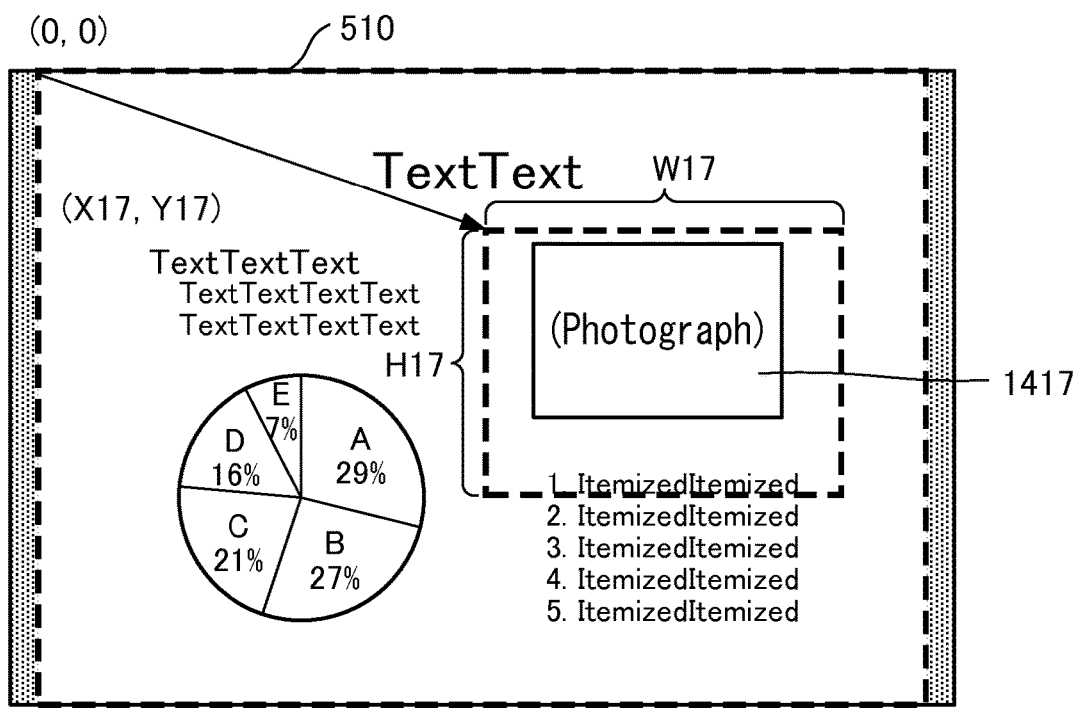

FIGS. 14A to 14C illustrate an example of manual specification processing of the partial area according to the present embodiment. Here, the description will be given of the case that the pinch-in and the pinch-out operations are performed from a state where the partial area shown in FIG. 14A is displayed on the display unit 105 of the mobile terminal 100, and then an area including a plurality of the automatically recognized partial areas shown in FIG. 14B is manually specified.

Note that the hardware configuration of the mobile terminal, the processing block of the mobile terminal, the display unit of the mobile terminal and the automatic recognition processing of the partial area are the same as respectively described in the first embodiment with reference to FIG. 1, FIG. 2, FIG. 3, and FIG. 4. Therefore, the explanation thereof will be omitted.

In addition, with respect to the management processing of the partial area shown in FIG. 4, the manual specification processing of the partial area shown in FIG. 6, the display processing of the partial area group shown in FIG. 10, and the display range determination processing of the partial area shown in FIG. 11, the processing procedures are the same as that of the first embodiment. Whereas the manually specified partial area to be a processing target is that of the area shown in FIG. 5B in the first embodiment, in the present embodiment, it is the area shown in FIG. 14B, and that is the difference.

(Manual specification processing of the partial area)

Firstly, a description will be given of the manual specification processing of the partial area according to the present embodiment. The manual specification processing unit 202 performs the manual specification processing of the partial area by the procedure shown in FIG. 6, which is the same as the first embodiment.

In step 601, the manual specification processing unit 202 receives the pinch-in and the pinch-out events via the operation control unit 205.

In step 602, the manual specification processing unit 202 performs magnification/reduction processing on the partial area being displayed on the display unit 105 according to the moving distance about which the pinch-in and the pinch-out events have provided notification. For example, when the pinch-in and the pinch-out events are received via the operation control unit 205 while displaying FIG. 14A on the display unit 105 of the mobile terminal, the manual specification processing unit 202 magnifies and displays the partial area being displayed according to the moving distance as shown in FIG. 14B.

In step 603, the manual specification processing unit 202 displays the "add" button 701 shown in FIG. 14B, when the notification of the pinch-in and the pinch-out events from the operation control unit 205 ends.

In step 604, the manual specification processing unit 202 determines whether or not the tap event on the "add" button 701 of the partial area is received via the operation control unit 205. When the tap event on the "add" button 701 of the partial area is received, the manual specification processing unit 202 proceeds to step 605 in order to receive additional instructions for the partial area. When the tap event on the "add" button 701 of the partial area is not received, the manual specification processing unit 202 ends the manual specification processing of the partial area.

In step 605, the manual specification processing unit 202 acquires the page number and the identifier of the partial area that have been displayed during the pinch-in and the pinch-out events are received in step 601. In FIG. 14A, since the image data of the partial area record for which the page number is 1 and the identifier is ID01 in the partial area management table shown in FIG. 9A are displayed, the page number 1 and the identifier ID01 are acquired.

In step 606, the manual specification processing unit 202 acquires the width and the height of the display unit 105 of the mobile terminal during reception of the tap event on the "add" button 701 of the partial area. As shown in FIG. 3, the width and the height of the display unit 105 of the mobile terminal 100 is (W00, H00). In step 607, the manual specification processing unit 202 acquires the coordinates and the display magnification rate of the area being displayed on the display unit 105 of the mobile terminal 100. The description will be given of the coordinates and the display magnification rate of the area being displayed by using FIGS. 14B and 14C. The display range being displayed on the display unit 105 of the mobile terminal 100 shown in FIG. 14B corresponds to the partial area 1417 shown in FIG. 14C.

With respect to the coordinates of the partial area 1417 shown in FIG. 14C, similar to the automatic recognition processing, the upper-left corner of the partial area 510 with the background attribute is taken as the origin, and a distance X17 and a distance Y17, which are the distance from the origin to the coordinate of the upper-left corner of the partial area 1417 in the x-axis direction and the y-axis direction, are acquired. Additionally, with respect to the magnification rate, a magnification rate M17 of the partial area 1417 to the partial area 510 with the background attribute is acquired from the moving distance of the pinch-in and the pinch-out or the like, about which notification is provided in the pinch-in and the pinch-out events.

In step 608, the manual specification processing unit 202 acquires a width W17 and a height H17 of the partial area 1417 shown in FIG. 14C by the magnification rate M16 of the partial area 1417 and the width and the height (W00, H00) of the display unit of the mobile terminal, which are acquired in the front step. In this case, the width W17 of the partial area 1417 is acquired as W00/M17 (a quotient upon division of W00 by M17) and the height H17 is acquired as H00/M17 (a quotient upon division of H00 by M17).

In the processing hitherto, the manual specification processing unit 202 acquires (X17, Y17) as the coordinates and (W17, H17) as the width and the height of the partial area 1417 being displayed on the display unit 105 of the mobile terminal 100, when the addition instruction of the partial area is received.

In step 609, the manual specification processing unit 202 sets manual specification as an attribute of the partial area that is manually specified.

In step 610, the manual specification processing unit 202 combines the coordinate, the width and the height, the attribute, the page number, and the identifier, which are acquired by the front step, together into manual specification data of the partial area, and transfers the manual specification data to the partial area management unit 203. When step S609 is completed, the manual specification processing unit 202 ends the manual specification preprocess.

(Management of the Partial Area)

The partial area management unit 203 manages the partial area by the procedure shown in FIG. 8 the same as the management of the partial area according to the first embodiment. Here, in the present embodiment, the partial area management unit 203 uses the partial area management table shown in FIG. 15.

Note that the processing procedure of the partial area management unit 203 is included in the image display program stored in the ROM 103 and is executed by the CPU 101. The management table of the partial area is stored in the storage area of the RAM 102, the HDD 104, or the like of the mobile terminal.

In step 801, the partial area management unit 203 determines whether the received data is the automatic recognition data of the partial area or the manual specification data of the partial area or deletion instruction data. In the present embodiment, only the case in which the partial area management unit 203 has received the manual specification data (the case of proceeding to step 803) is described. In the other cases, the processing the same as the first embodiment is performed.

In step 803, the partial area management unit 203 acquires data (the coordinates, the width and the height, the attribute, the page number, and the identifier) related to the partial area included in the manual specification data, and adds them to the partial area management table shown in FIG. 15 as the partial area record.

The partial area table shown in FIG. 15 is a table to which a record of the partial area, which is manually specified as shown in FIGS. 14B and 14C, is added to the partial area management table shown in FIG. 9A. Note that the manually specified partial area record is added to the 7th record shown in FIG. 15.

When the partial area management unit 203 receives the manually specified partial area data, the partial area management unit 203 retrieves a partial area record that has the page number included in the manually specified partial area data from the partial area management table. Then, the partial area management unit 203 adds the received manually specified partial area data after the partial area record which has the last identifier with the corresponding page number. In this example, since the page number included in the received manual specification data of the partial area is 1, the partial area record is added after the record that has the last identifier, which is ID06, of the page number 1 as having ID07.

The partial area management unit 203 adds the data to each of the items of the partial area management table as below.

With respect to the page number 901, the page number included in the manually specified partial area data is added. In this example, page number 1 is added. With respect to the identifier 902, as described above, ID07 is added.

With respect to the coordinate 903 and the width and the height 904, the coordinates and the width and the height included in the manually specified partial area data are added. These values are acquired in step 605 of the manual specification processing shown in FIG. 6. For Example, in the case of the partial area 1417 that is manually specified in FIGS. 14B and 14C, the coordinates are (X17, Y17) and the width and the height are (W17, H17).

With respect to the attribute 905, the manual specification, which is the value of the attribute included in the manually specified partial area data, is added. This value is set in step 609 of the manual specification processing shown in FIG. 6.

With respect to the display order 906, the display order of the manually specified partial area is inserted next (immediately after) to the partial areas that are the automatically recognized partial areas and overlap in the corresponding page in which the manually specified partial area is included. Here, when there is a plurality of the automatically recognized partial areas being displayed on the display unit 105 of the mobile terminal 100 upon manual specification, the partial areas that overlap in the corresponding page in which the manually specified partial area is included is that plurality of the automatically recognized partial areas. More specifically, in the management table of the partial area, the coordinates and the width and the height included in the manually specified partial area data are compared with the coordinates and the widths and the heights of the automatically recognized partial area records of the same page number, and the manually specified partial area is added after the partial areas of which the ranges thereof overlap. When a manually specified partial area overlaps with a plurality of the partial areas, it is added after the partial area for which the display order is latest.

For example, in the case of the partial area 1417 which is manually specified in FIGS. 14B and 14C, the coordinate and the width and the height included in the manually specified partial area data is compared with the coordinates and the widths and the heights included in the automatically recognized partial area records of the same page number in the partial area management table shown in FIG. 9A. More specifically, the coordinates (X17, Y17) and the width and the height (W17, H17) of the manually specified partial area 1417 is compared with the coordinates and the widths and the heights included in the six automatically recognized partial area records of the same page number in the partial area management table shown in FIG. 9A. As a result, the partial area management unit 203 determines that the partial area which is specified by the coordinates (X17, Y17) and the width and the height (W17, H17) overlaps with two partial area records. More specifically, it is determined that there are overlapping ranges with the partial area record for which the identifier is ID05, which is the photograph partial area 514 shown in FIG. 5B, and the partial area record for which the identifier is ID06, which is the itemized partial area 515 shown in FIG. 5B. In the partial area management table shown in FIG. 9A, the display order of the partial areas, for which the identifiers are ID05 and ID06, are respectively 5 and 6. Therefore, the display order of the manually specified partial area is set as the next display order, which is 7. Furthermore, if there were records that the display orders were 7 or subsequent number in page number 1, those display orders are shifted back by one each. The partial area management table of FIG. 15 illustrates this state.

When the partial area management unit 203 receives the manually specified partial area data, the partial area management unit 203 adds the various data to each of the items of the partial area management table as shown above and ends the management processing of the partial area.

As described above, in the present embodiment, the partial area can be added by the manual specification to the plurality of the automatically recognized partial areas. In addition, the same as the first embodiment, the data related to the manually specified partial area can be managed in the same way as the data related to the automatically recognized partial area.

(Display example 3 of the partial area group)

FIGS. 16A to 16G illustrate the screen transition during the display processing of the partial area which is manually specified as described above. Here, a description will be given of the screen transition of the display unit 105 of the mobile terminal 100 when the partial area management table shown in FIG. 15 is read and the display processing of the partial area group shown in FIG. 10 and the display range determination processing of the partial area shown in FIG, 11 are performed.

The screen of the mobile terminal transits in the order of FIG. 16A, FIG. 16B, FIG. 16C, FIG. 16D, FIG. 16E, and FIG. 16F.

The partial area display unit 204 follows the step of the display processing of the partial area group shown in FIG. 10 and in step 1001, reads the record of which the display order is the top of the first page, which the identifier is ID01, from the partial area management table shown in FIG. 15. In step 1003, the partial area display unit 204 performs the display range determination processing of the partial area. In the display range determination processing of the partial area shown in FIG. 11, since the attribute of the partial area record, of which the identifier is ID01, is the background, the partial area display unit 204 executes step 1112 and determines the display magnification rate so that the whole partial area falls within the display unit 105 of the mobile terminal. Furthermore, the partial area display unit 204 executes step 1113 and determines the coordinate of the partial area so that the center of the partial area matches the center of the display unit 105 of the mobile terminal 100. In step 1004 of FIG. 10, according to the determined display magnification rate and the coordinate, the partial area display unit 204 displays the partial area on the display unit 105 of the mobile terminal 100. This display state is shown in FIG. 16A.

Figure 16A:
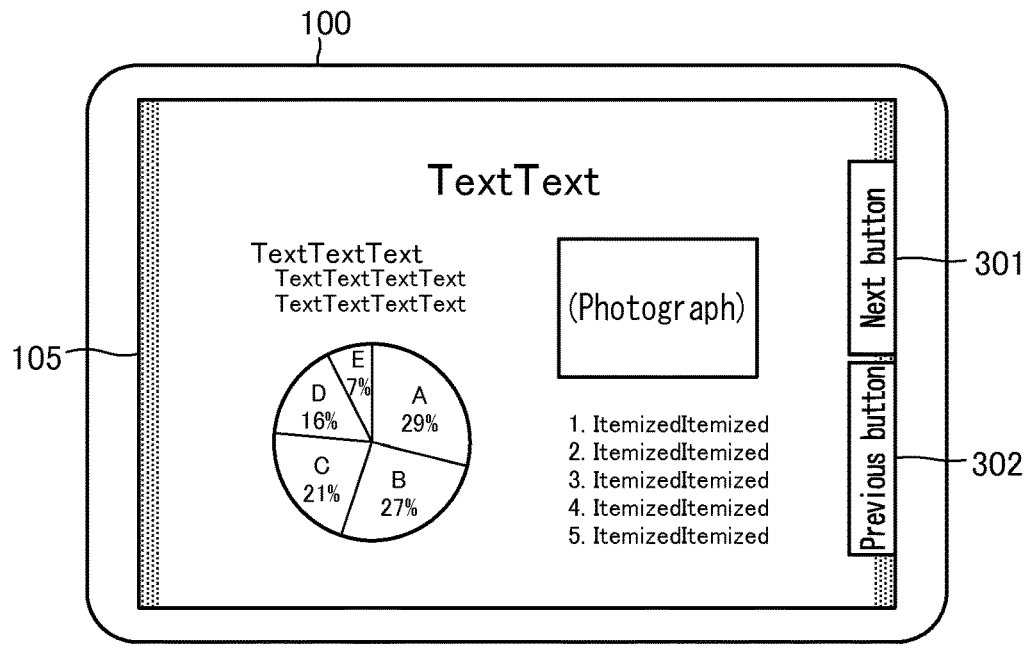
FIGS. 16A to 16G illustrate the screen transition during display processing of the partial area.

When the "next" button 301 is tapped on the display state shown in FIG. 16A (step 1005 in FIG. 10), the partial area display unit 204 reads the next record, for which the display order is 1 and the identifier is ID01, in the partial area management table shown in FIG. 15. In other words, the partial area record for which the display order is 2, which the identifier is ID02, is read (step 1001 in FIG. 10). In the display range determination processing in FIG. 11, since the attribute of the partial area record for which the identifier is ID02 is the character and horizontal writing, in step 1106 of FIG. 11, the partial area display unit 204 determines the display magnification rate so that the width of the partial area falls within the width of the display unit of the mobile terminal. The width and the height of the partial area for which the identifier is ID02, which is magnified by the determined display magnification rate, is smaller than the width and the height of the display unit 105 of the mobile terminal 100. Therefore, in step 1113, the partial area display unit 204 determines the coordinates of the partial area so that the center of the partial area matches the center of the display unit 105 of the mobile terminal 100. In step 1004 of FIG. 10, the partial area display unit 204 displays the partial area on the display unit 105 of the mobile terminal 100 in accordance with the determined display magnification rate and the coordinates. This display state is shown in FIG. 16B.

Figure 16B:
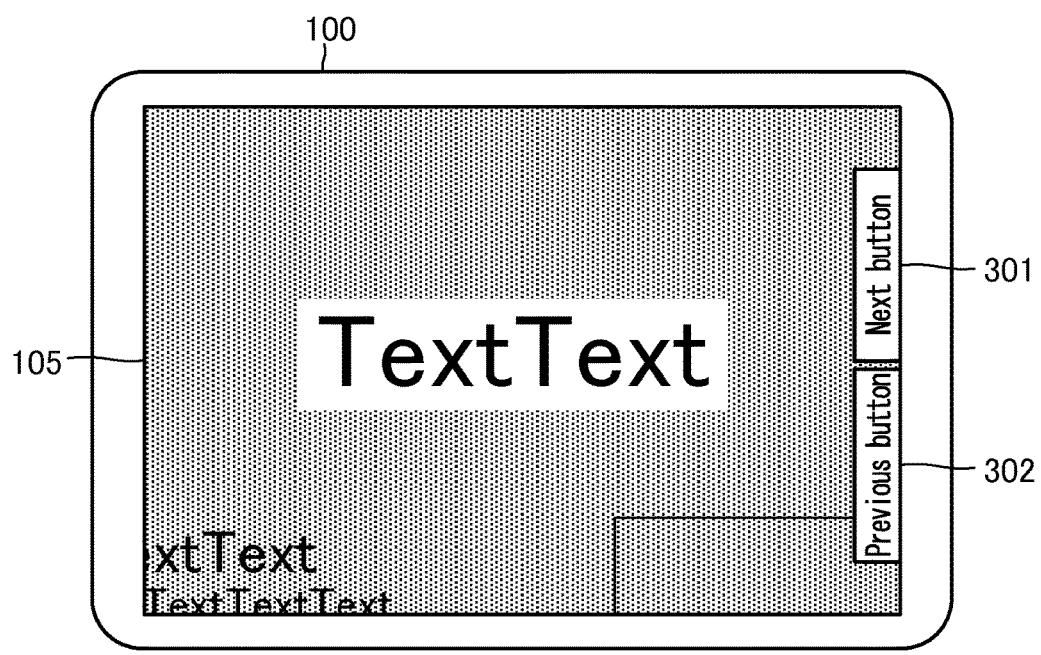

When the "next" button 301 is tapped on the display state shown in FIG. 16B (step 1005 in FIG. 10), the partial area display unit 204 reads the next record, for which the display order is 2 and the identifier is ID02, in the partial area management table shown in FIG. 15. In other words, the partial area record for which the display order is 3, which the identifier is ID03, is read (step 1001 in FIG. 10). In the display range determination processing in FIG. 11, since the attribute of the partial area record for which the identifier is ID03 is the character and horizontal writing, in step 1106 of FIG. 11, the partial area display unit 204 determines the display magnification rate so that the width of the partial area falls within the width of the display unit 105 of the mobile terminal 100. The width and the height of the partial area for which the identifier is ID03, which is magnified by the determined display magnification rate, is smaller than the width and the height of the display unit 105 of the mobile terminal 100. Therefore, in step 1113, the partial area display unit 204 determines the coordinates of the partial area so that the center of the partial area matches the center of the display unit 105 of the mobile terminal 100. In step 1004 of FIG. 10, the partial area display unit 204 displays the partial area on the display unit 105 of the mobile terminal 100 in accordance with the determined display magnification rate and the coordinates. This display state is shown in FIG. 16C.

Figure 16C:
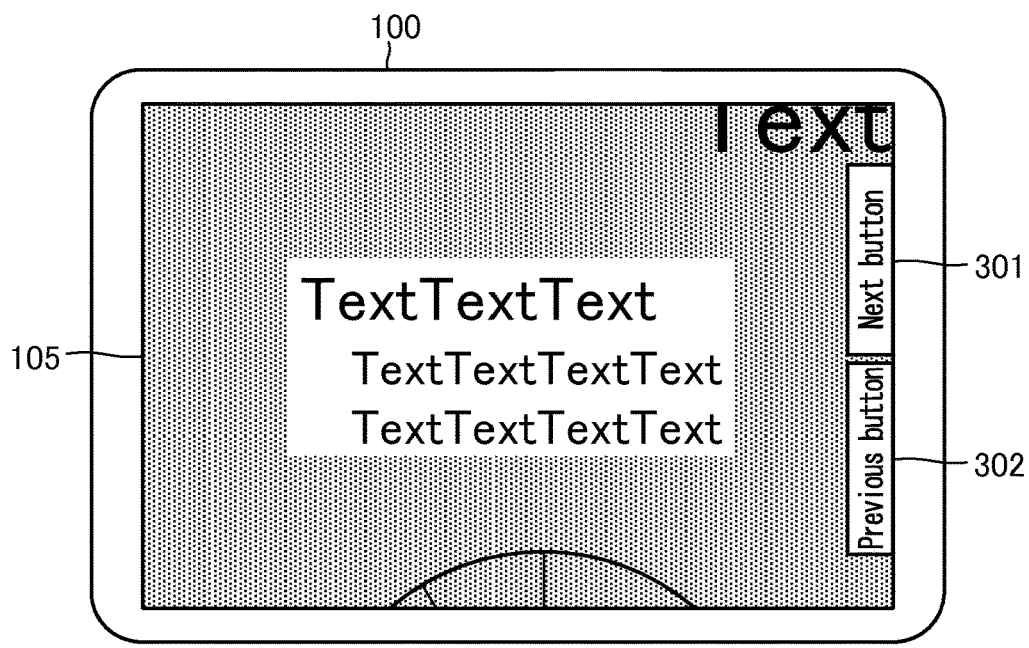

When the "next" button 301 is tapped on the display state shown in FIG. 16C (step 1005 in FIG. 10), the partial area display unit 204 reads the next record, for which the display order is 3 and the identifier is ID03, in the partial area management table shown in FIG. 15. In other words, the partial area record for which the display order is 4, which the identifier is ID04, is read (step 1001 in FIG. 10). In the display range determination processing in FIG. 11, since the attribute of the partial area record for which the identifier is ID04 is the drawing, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal 100. In step 1004 of FIG. 10, the partial area display unit 204 displays the partial area on the display unit 105 of the mobile terminal 100 in accordance with the determined display magnification rate and the coordinate. This display state is shown in FIG. 16D.

Figure 16D:
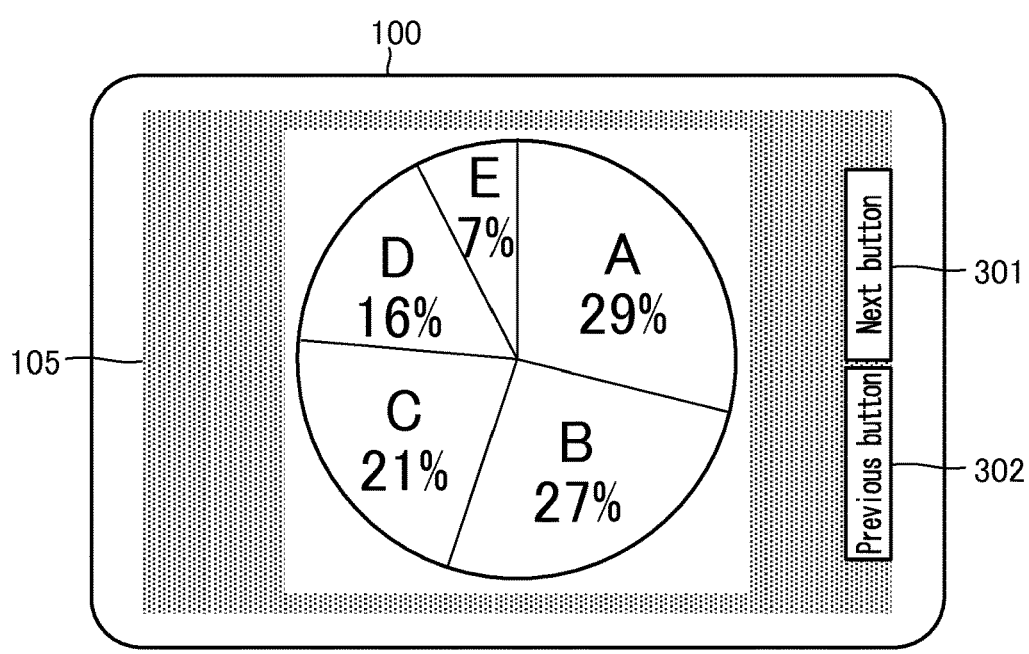

When the "next" button 301 is tapped on the display state shown in FIG. 16D (step 1005 in FIG. 10), the partial area display unit 204 reads the next record, for which the display order is 4 and the identifier is ID04, in the partial area management table shown in FIG. 15. In other words, the partial area record for which the display order is 5, which the identifier is ID05, is read (step 1001 in FIG. 10). In the display range determination processing in FIG. 11, since the attribute of the partial area record for which the identifier is ID05 is the photograph, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal. In step 1004 of FIG. 10, the partial area display unit 204 displays the partial area on the display unit 105 of the mobile terminal 100 in accordance with the determined display magnification rate and the coordinates. This display state is shown in FIG. 16E.

Figure 16E:
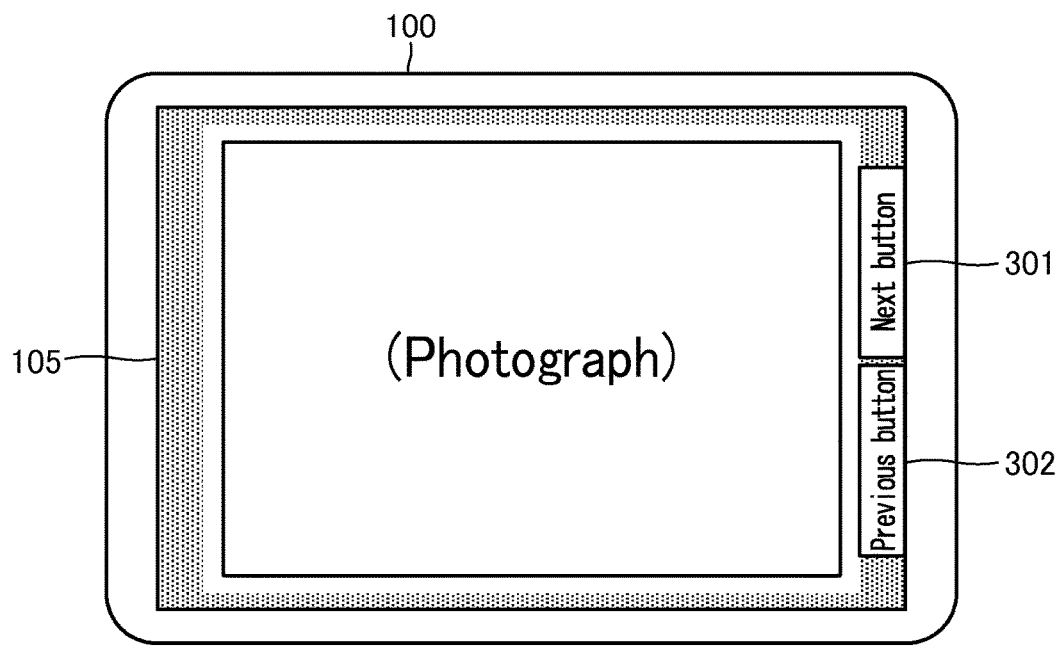

When the "next" button 301 is tapped on the display state shown in FIG. 16E (step 1005 in FIG. 10), the partial area display unit 204 reads the next record, for which the display order is 5 and the identifier is ID06, in the partial area management table shown in FIG. 15. In other words, the partial area record for which the display order is 6, which the identifier is ID06, is read (step 1001 in FIG. 10). In the display range determination processing in FIG. 11, since the attribute of the partial area record for which the identifier is ID05 is the character and itemized, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal. In step 1004 of FIG. 10, the partial area display unit 204 displays the partial area on the display unit 105 of the mobile terminal 100 in accordance with the determined display magnification rate and the coordinates. This display state is shown in FIG. 16F.

Figure 16F:
Figure 16G:
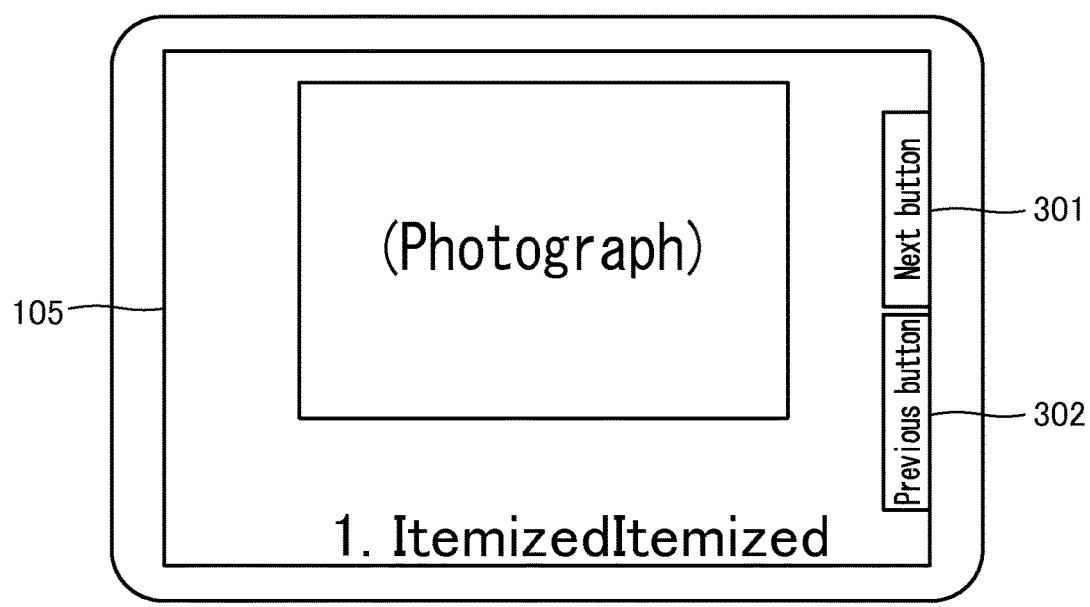

When the "next" button 301 is tapped on the display state shown in FIG. 16F (step 1005 in FIG. 10), the partial area display unit 204 reads the next record, for which the display order is 6 and the identifier is ID06, in the partial area management table shown in FIG. 15. In other words, the partial area record for which the display order is 7, which the identifier is ID07, is read (step 1001 in FIG. 10). In the display range determination processing in FIG. 11, since the attribute of the partial area record for which the identifier is ID07 is the manual specification, in step 1112, the partial area display unit 204 determines the display magnification rate so that the whole partial area falls within the display unit 105 of the mobile terminal 100. The partial area display unit 204 executes step 1113 and determines the coordinates of the partial area so that the center of the partial area matches the center of the display unit 105 of the mobile terminal. In step 1004 of FIG. 10, the partial area display unit 204 displays the partial area on the display unit 105 of the mobile terminal 100 in accordance with the determined display magnification rate and the coordinate. This display state is shown in FIG. 16G.

As described above, according to the present embodiment, the same effects as those of the first embodiment are exhibited. Furthermore, according to the present embodiment, even if the area that includes a plurality of the automatically recognized partial areas is manually specified, both the automatically recognized partial area and the manually specified partial area can be displayed by the magnification rate of the respective partial area with a simple operation.

(Third Embodiment)

Next, a description will be given of the image apparatus according to the third embodiment of the present invention. In the first embodiment and the second embodiment, all of the automatically recognized partial areas and the manually specified partial areas, which are the partial areas on the same page, are the display targets in the display processing, whereas, in the display processing according to the present embodiment, it is different from the other embodiments in that the user can set display or non-display of the partial area.

In the present embodiment, the description will be given of a display setting processing of the partial area. A display setting of the respective partial areas is a processing for setting to display or not to display the partial area. The display setting processing of the partial area according to the present embodiment is performed both on the automatically recognized partial area and the manually specified partial area.

Note that the hardware configuration of the mobile terminal, the processing block of the mobile terminal, the display unit of the mobile terminal, and the automatic recognition processing of the partial area are the same as those respectively described in the first embodiment with reference to FIG. 1, FIG. 2, FIG. 3, and FIG. 4. Therefore, the explanation thereof will be omitted.

(Management Processing of the Partial Area)

Figure 17:
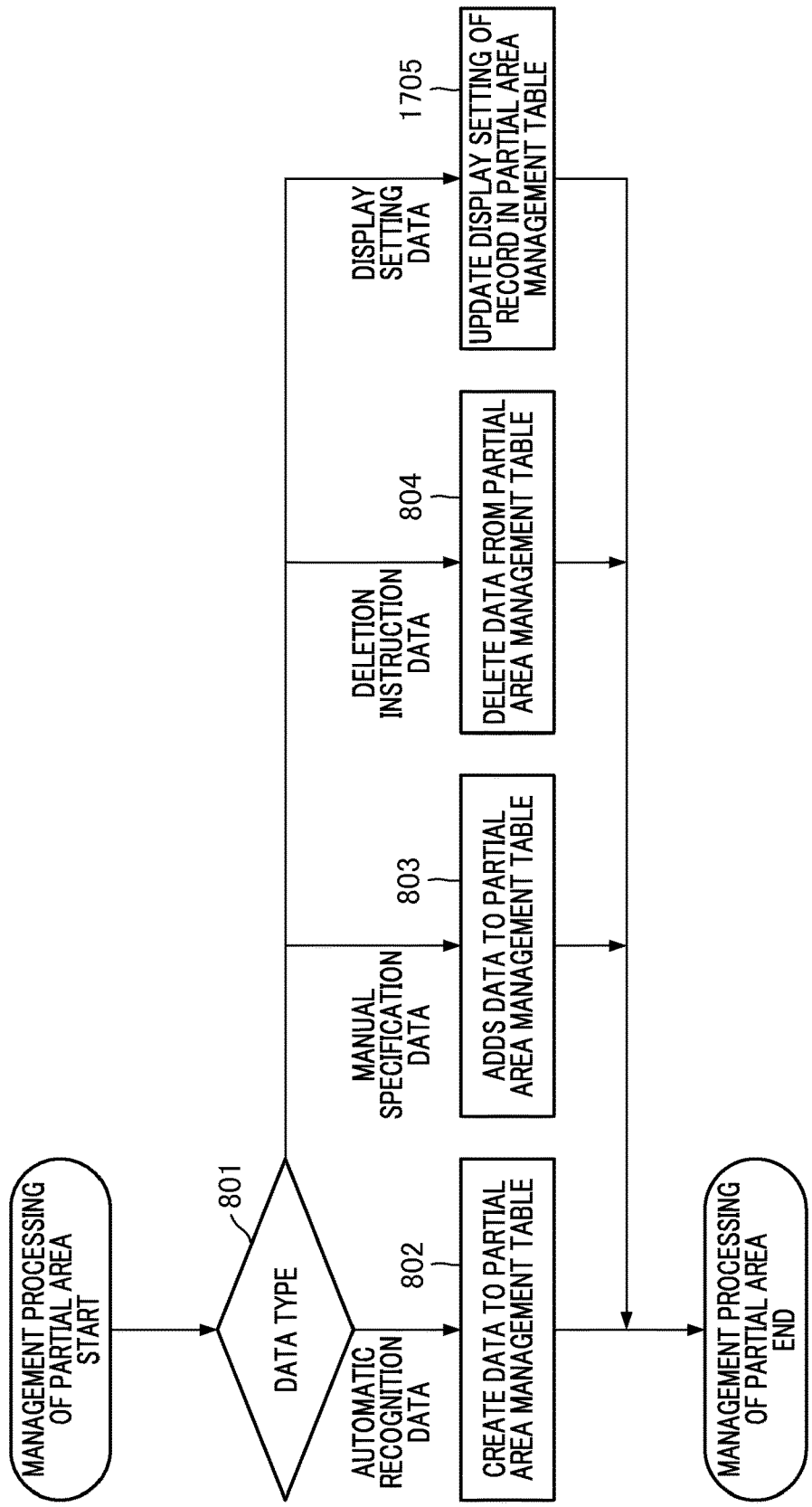
FIG. 17 is a flowchart illustrating management processing of the partial area.

FIG. 17 is a flowchart illustrating a processing by which the partial area management unit 203 manages the partial area. Furthermore, FIGS. 18A and 18B illustrate a partial area management table that the partial area management unit 203 uses for managing the partial areas.

Note that the processing procedure of the partial area management unit 203 is included in the image display program stored in the ROM 103 and is executed by the CPU 101. The management table of the partial area is stored in the storage area of the RAM 102, the HDD 104, or the like of the mobile terminal.

The steps 801 to 804 of the management processing of the partial area shown in FIG. 17 are the same as those described in steps 801 to 804 of the management processing of the partial area shown in FIG. 8. Therefore, the explanation thereof will be omitted. Here, step 1705 in FIG. 17, which is different from the first embodiment, is described.

In addition, among items of the management table of the partial area shown in FIG. 18A, the page number 901, the identifier 902, the coordinates 903, the width and the height 904, the attribute 905, and the display order 906 are as same as each of the item of the management table of the partial area described in FIG. 9. Therefore, the explanation thereof will be omitted. As a display setting 1807, which is a different item from the first embodiment, setting of display "ON"/non-display "OFF" of each of the partial areas is stored. Here, a description will be given of the display processing of the partial area display unit 204 in the case of the display setting 1807 is ON, and the display setting 1807 is OFF.

Note that the default value of the display setting 1807 is ON. When the partial area management unit 203 receives the automatic recognition data of the partial area shown in the first embodiment and creates the partial area record, the partial area management unit 203 sets the display setting to ON. Also, when the partial area management unit 203 receives the manual specification data of the partial area shown in the first embodiment and creates the partial area record, the partial area management unit 203 sets the display setting to ON.

Figure 5A:
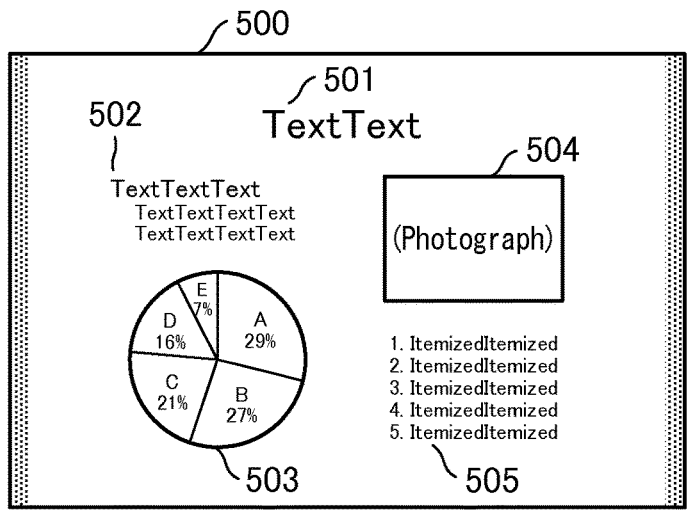
FIGS. 5A to 5C illustrate an example in which the partial areas of a page image have been automatically recognized according to document components.
Figure 5B:
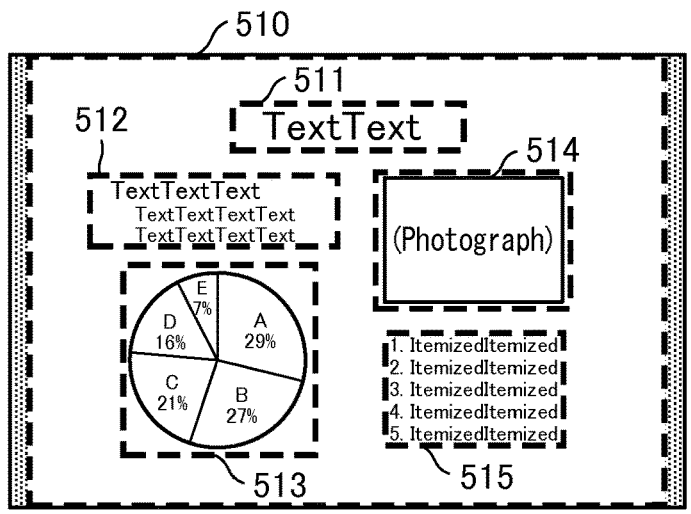
Figure 5C:
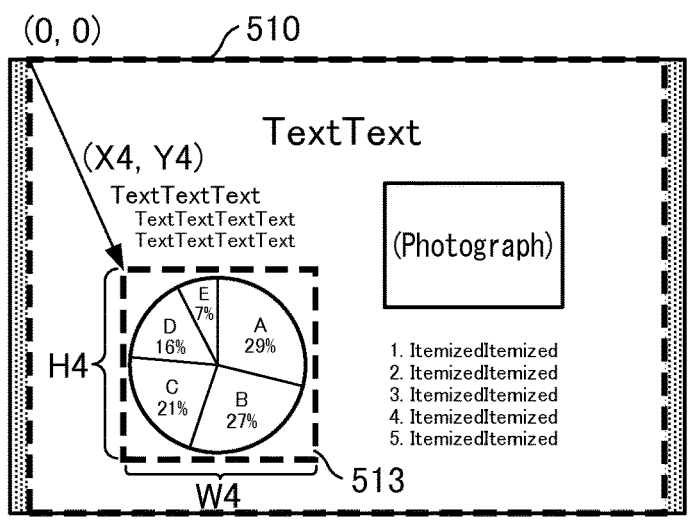

The partial area management table shown in FIG. 18A is in the same state of the partial area management table shown in FIG. 9B, which is the state in which the automatic recognition processing is performed on the page image shown in FIGS. 5A and 5B, and the partial area shown in FIG. 7B is added by the manual specification processing. As disclosed above, all of the display settings 1807 of the automatically recognized area and the manually specified area are ON.

Here, in step 1705 of FIG. 17, the partial area management unit 203 acquires the display setting data of the partial area. The display setting data is data transformed from the partial area display unit 204 and includes the page number, the identifier, and the display setting. The partial area display unit 204 transforms the display setting data to the partial area management unit 203 in an editing processing of the partial area described below with reference to FIG. 21. The partial area management unit 203 updates the display setting of the partial area record designated by the page number and the identifier in the management table of the partial area shown in FIG. 18. For example, if it is designated in the setting data acquired by the partial area management unit 203 in step 1705 as follows, the management table of the partial area is updated from FIG. 18A to FIG. 18B.

page number=1, identifier=ID02, display setting=OFF
page number=1, identifier=ID03, display setting=OFF
page number=1, identifier=ID06, display setting=OFF The partial area management unit 203 ends the partial area management processing after updating the display setting.

(Display Processing of the Display Setting)

Figure 19:
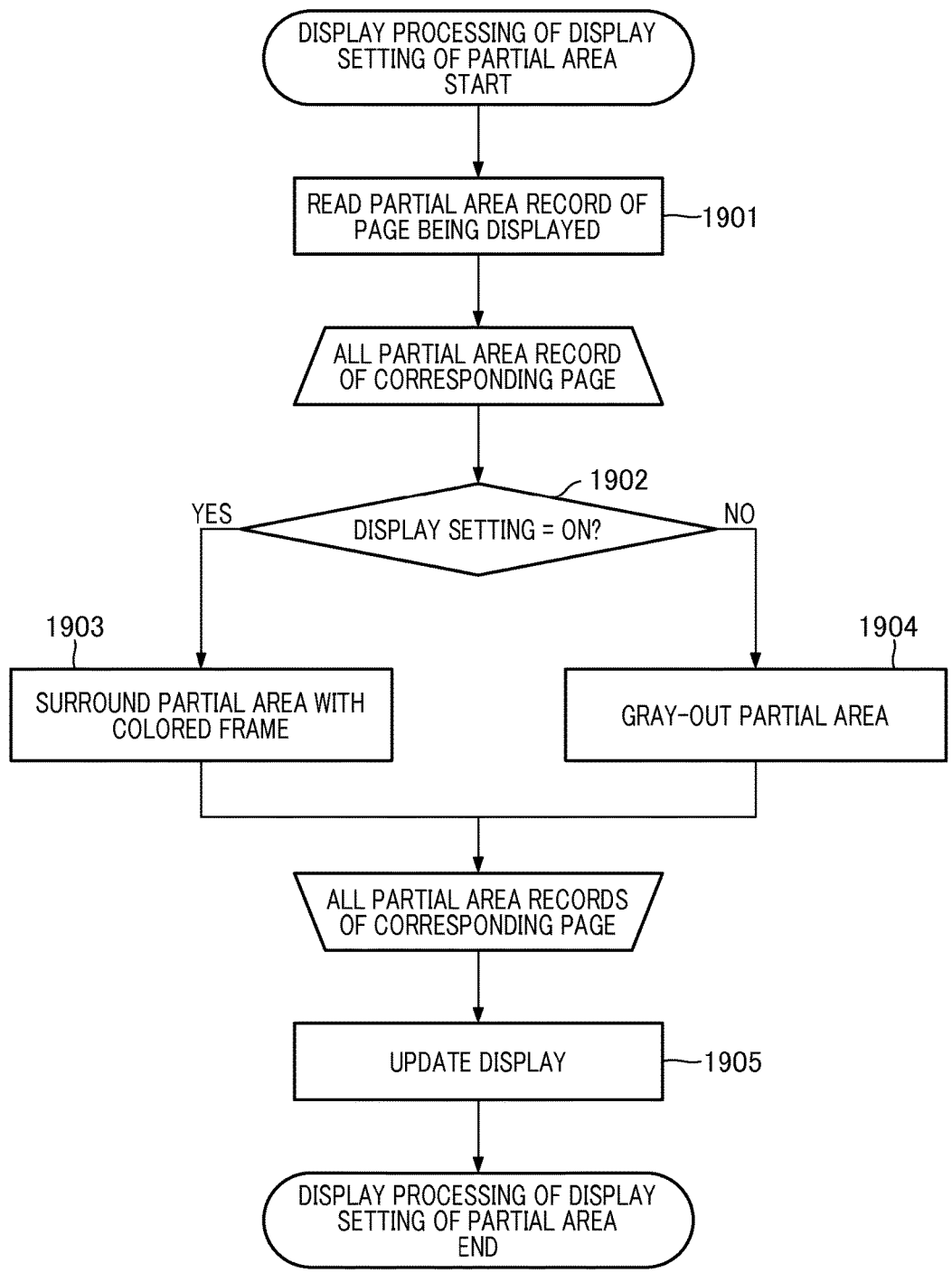
FIG. 19 is a flowchart illustrating display processing of a display setting of the partial area.

FIG. 19 is a flowchart illustrating a display processing of the display setting of the partial area, which is performed by the partial area display unit 204.

Figure 21:
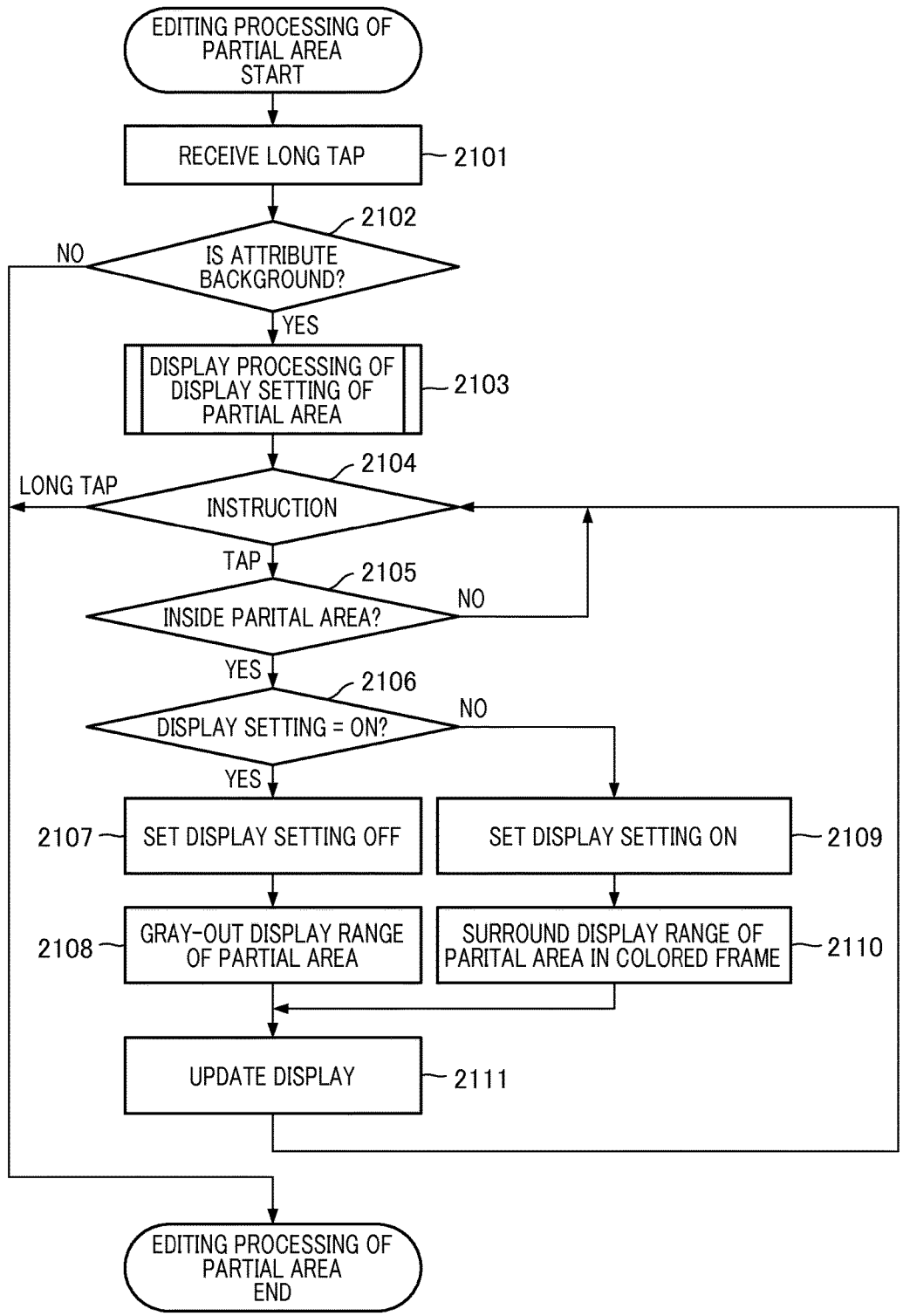
FIG. 21 is a flowchart illustrating editing processing of the display setting of the partial area.

The display processing of the display setting of the partial area is a processing for displaying the state of the display ON or display OFF on the display unit 105 of the mobile terminal, which is related to the display setting of each of the partial areas stored in the partial area management table shown in FIGS. 18A and 18B. Note that the processing procedure of the partial area display unit 204 shown in FIG. 21 is included in the image display program stored in the ROM 103, and is executed by the CPU 101.

Firstly, in step 1901, the partial area display unit 204 reads all of the partial area records of the page being displayed from the partial area management table. For example, in the partial area management table shown in FIG. 18A, in the case of the partial area record for which the page number is 1, records for which the identifier is ID01 to ID07 are read.

Next, the partial area display unit 204 repeats the processing of step 1902 to 1904 on all of the partial area records of the page being displayed currently. For example, in the case that the page number is 1 in the partial area management table shown in FIG. 18A, the processing is performed to seven of the partial area records for which the identifiers are ID01 to ID07.

In step 1902, the partial area display unit 204 acquires the display setting of the partial area record and, if the display setting is ON, proceeds to step 1903. If the display setting is OFF, the partial area display unit 204 proceeds to step 1904.

In step 1903, the partial area display unit 204 changes the display state of the partial area so that the user can visually recognize the state that the display setting is ON. For example, the partial area display unit 204 acquires the coordinates and the width and the height of the partial area record and puts the frame, which surrounds the partial area of the coordinates and the width and the height, into a bold line in red or the like.

In contrast, the partial area display unit 204 changes the display state of the partial area so that the user can visually recognize the state in which the display setting is OFF. For example, the partial area display unit 204 acquires the coordinates and the width and the height of the partial area record and places these inside the frame, which surrounds the partial area of the coordinate and the width and the height, into a translucent gray-out state. By displaying in translucent, the content of the partial area can be confirmed even it is in a gray-out state.

In step 1905, after performing the processing of step 1902 to 1904 on all of the partial area records included in the page, the partial area display unit 204 updates the display state of the display unit 105 of the mobile terminal.

Figure 20A:
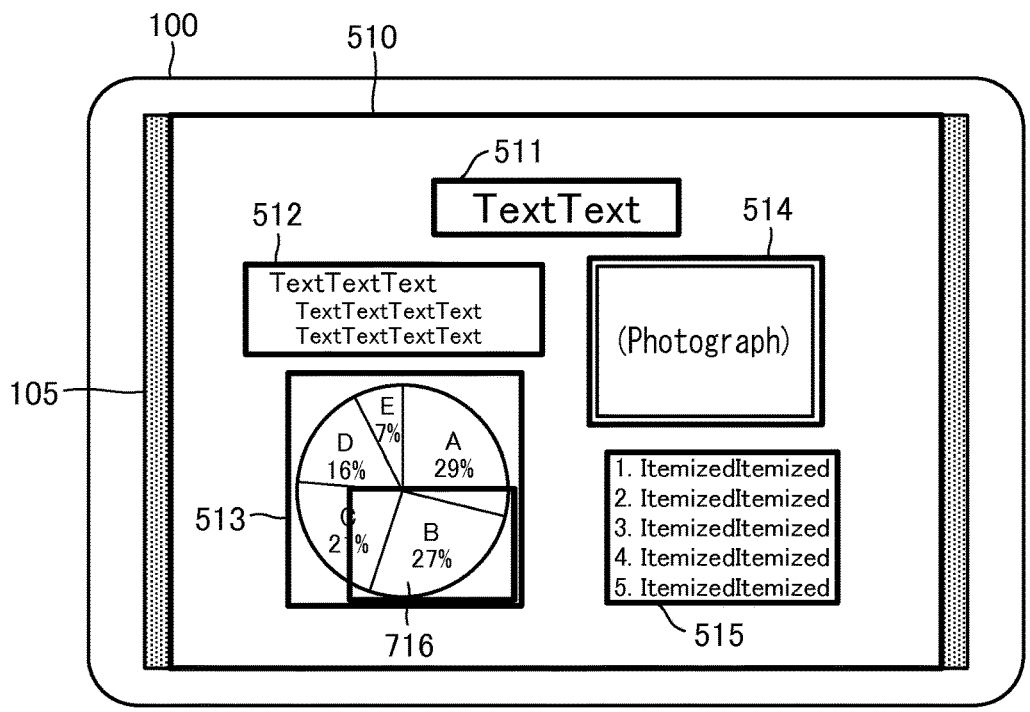
FIGS. 20A and 20B illustrate screens during display processing of the display setting of the partial area.

For example, when the partial area record that the page number is 1 in the partial area management table shown in FIG. 18A is read, the display settings of all of the partial area records are ON, the display state is updated in a state in which the frames of all of the partial areas are put into the bold line. The display unit 105 of the mobile terminal at this time is shown in FIG. 20A.

Figure 20B:
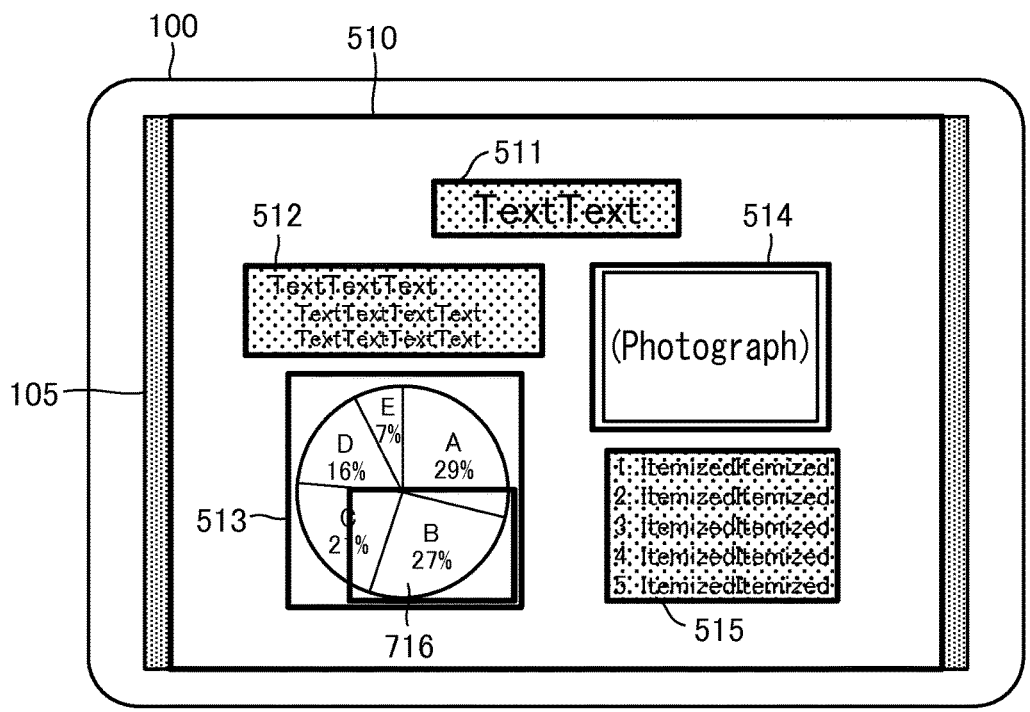

Furthermore, for example, when the partial area record for which the page number is 1 in the partial area management table shown in FIG. 18B is read, the display setting of the partial area records, for which the identifier is ID01, ID04, ID05 and ID07, are ON. Therefore, the display state is updated to a state in which the frames of those partial areas are put into the bold line. On the other hand, since the display setting of the partial area records, for which the identifiers are ID02, ID03, and ID06, are OFF, the display state is updated to a state in which inside of the frames of those partial areas are in a gray-out state. The display unit 105 of the mobile terminal at this time is shown in FIG. 20B.

(Editing Processing of the Display Setting)

FIG. 21 is a flowchart illustrating editing processing of the display setting of the partial area that is performed by the partial area display unit 204. Here, the partial area display unit 204 functions as a selection unit configured to select whether or not to display the partial area.

Note that the processing procedure shown in FIG. 21 of the partial area display unit 204 is included in the image display program stored in the ROM 103 and is executed by the CPU 101.

Figure 23A:
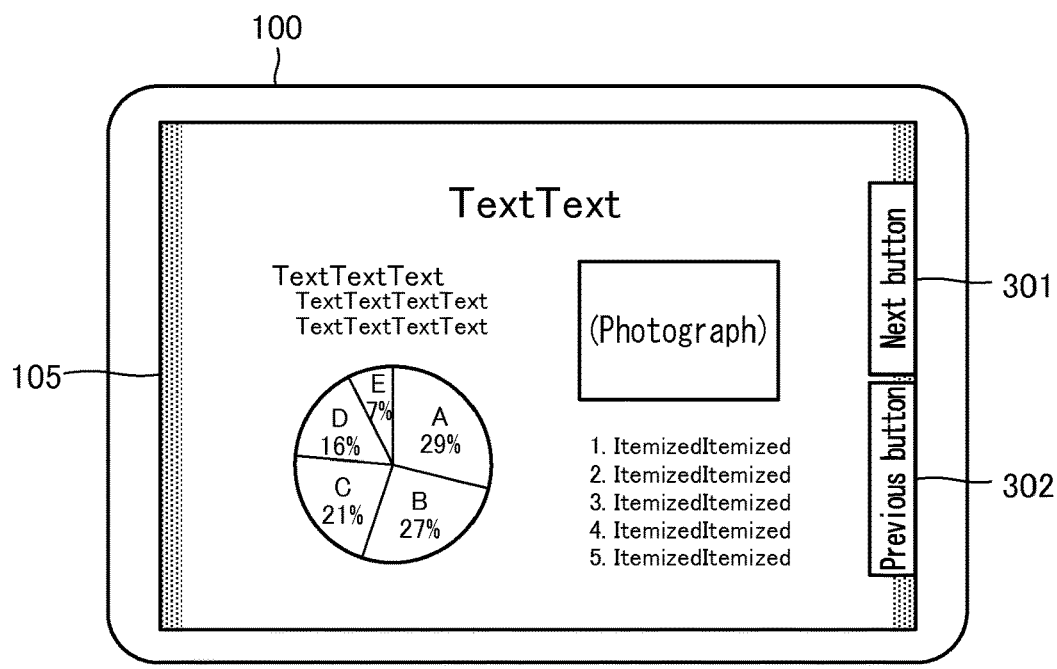
FIGS. 23A to 23D illustrate a screen transition while displaying the partial area.

Here, as an example, the description will be given of a case in which the partial area display unit 204 is displaying the partial area record for which the page number is 1 and the identifier is ID01 in accordance with the partial area management table shown in FIG. 18A. The display unit 105 of the mobile terminal at this time is shown in FIG. 23A.

In step 2101, if the display unit 105 of the mobile terminal 100 receives the long tap operation while displaying the partial area, the partial area display unit 204 receives the long tap event via the operation control unit 205.

In step 2102, when the partial area display unit 204 receives the long tap event, the partial area display unit 204 determines the attribute of the partial area being displayed. More specifically the partial area display unit 204 retrieves a partial area record that is determined uniquely by the page number and the identifier of the partial area being displayed from the partial area management table shown in FIG. 18A, and acquires the attribute of the partial area record. In this example, the partial area shown in FIG. 23A is being displayed and the page number thereof is 1 and the identifier is ID01. Thus, referring to the partial area management table shown in FIG. 18A, the attribute of the corresponding partial area record is determined to the background.

If the attribute of the partial area being displayed is the background, the partial area display unit 204 proceeds to step 2103. In contrast, if the attribute is not the background, the partial area display unit 204 ends the editing processing of the display setting.

In step 2103, the partial area display unit 204 performs the display processing of the display setting of the partial area described in FIG. 19. In this example, when the partial area management table shown in FIG. 18A (the display settings are all ON) is read, the display unit 105 of the mobile terminal displays FIG. 20A as described in FIG. 19.

In step 2104, the partial area display unit 204 determines whether or not the user operation on the display unit 105 of the mobile terminal is received while FIG. 20A is displayed. More specifically, the partial area display unit 204 determines whether or not an operation instruction event is received via the operation control unit 205. If the partial area display unit 204 receives the tap event from the operation control unit 205, the partial area display unit 204 proceeds to step 2105. In contrast, if the partial area display unit 204 receives the long tap event from the operation control unit 205, the partial area display unit 204 ends the editing processing of the display setting.

In step 2105, the partial area display unit 204 determines whether or not the tapped coordinate is included in one of the partial areas shown in FIG. 20A. More specifically, the partial area display unit 204 performs hit detection between the coordinates of all of the partial area records of the corresponding page, which are stored in the partial area management table, and the tapped coordinates. If the determination result is true, the partial area display unit 204 proceeds to step 2106. If the determination result is false, the partial area display unit 204 returns to step 2104 and waits for an operation instruction from the user.

In step 2106, the partial area display unit 204 determines whether or not the display setting of the partial area that is at the tapped coordinates is ON. In this example, assume that the state of FIG. 20A is displayed in accordance with the partial area management table shown in FIG. 18A, and the partial area 511 is tapped in this state. In this case, the display setting of the partial area record for which the page number is one and the identifier is ID02 in the partial area management table shown in FIG. 18A is ON. Therefore, the partial area display unit 204 proceeds to step 2107. In contrast, if the display setting is OFF, the partial area display unit 204 proceeds to step 2109.

In step 2107, since the display setting of the tapped partial area is ON, the partial area display unit 204 sets the display setting to OFF. The partial area display unit 204 transforms the page number, the identifier, and the display setting (OFF) of the tapped partial area as display setting data to the partial area management unit 203. The partial area display unit 204 updates the display setting of the partial area record, which is designated in the display setting data, to OFF as described in step 1705 shown in FIG. 17.

In step 2108, since the display setting of the tapped partial area is set to OFF, the partial area display unit 204 updates the display state of the partial area so that the user can visually recognize the state in which the display setting is OFF. More specifically, the partial area display unit 204 grays out the inside the frame of the tapped partial area to translucent state as described in step 1904 shown in FIG. 19.

In step 2109, since the display setting of the tapped partial area is OFF, the partial area display unit 204 sets the display setting to ON. The partial area display unit 204 transfers the page number, the identifier, and the display setting (OFF) of the tapped partial area as the display setting data to the partial area management unit 203. The partial area display unit 204 updates the display setting of the partial area record, which is designated in the display setting data, to ON as described in step 1705 shown in FIG. 17.

In step 2110, since the display setting of the tapped partial area is set to ON, the partial area display unit 204 updates the display state of the partial area so that the user can visually recognize the state in which the display setting is ON. More specifically, the partial area display unit 204 puts the frame of the tapped partial area into the bold line in read or the like as described in step 1903 shown in FIG. 19.

In step 2111, the partial area display unit 204 modifies the display state that has been set in step 2108 or step 2110 on the display unit 105 of the mobile terminal. After the modification of the display unit of the mobile terminal, the partial area display unit 204 returns to step 2104 and waits for an operation instruction from the user, and the user can continuously tap the other partial area to change the display setting of the respective partial area.

Here, the screen shown in FIG. 20A is displayed in accordance with the partial area management table shown in FIG. 18A, and when the partial areas 511, 512 and 515 in FIG. 20A are tapped, the screen shown in FIG. 20B will be displayed. In other words, the display settings of the partial area records corresponding to the partial areas 511, 512, and 515, which are the records of ID02, ID03, and ID06, are changed from ON to OFF, and the screen shown in FIG. 20B will be displayed.

As described in step 2104, if the partial area display unit 204 receives a long tap on the display unit 105 of the mobile terminal, the partial area display unit 204 ends the editing processing of the partial area.

(Display Processing of the Partial Area Group)

Figure 22:
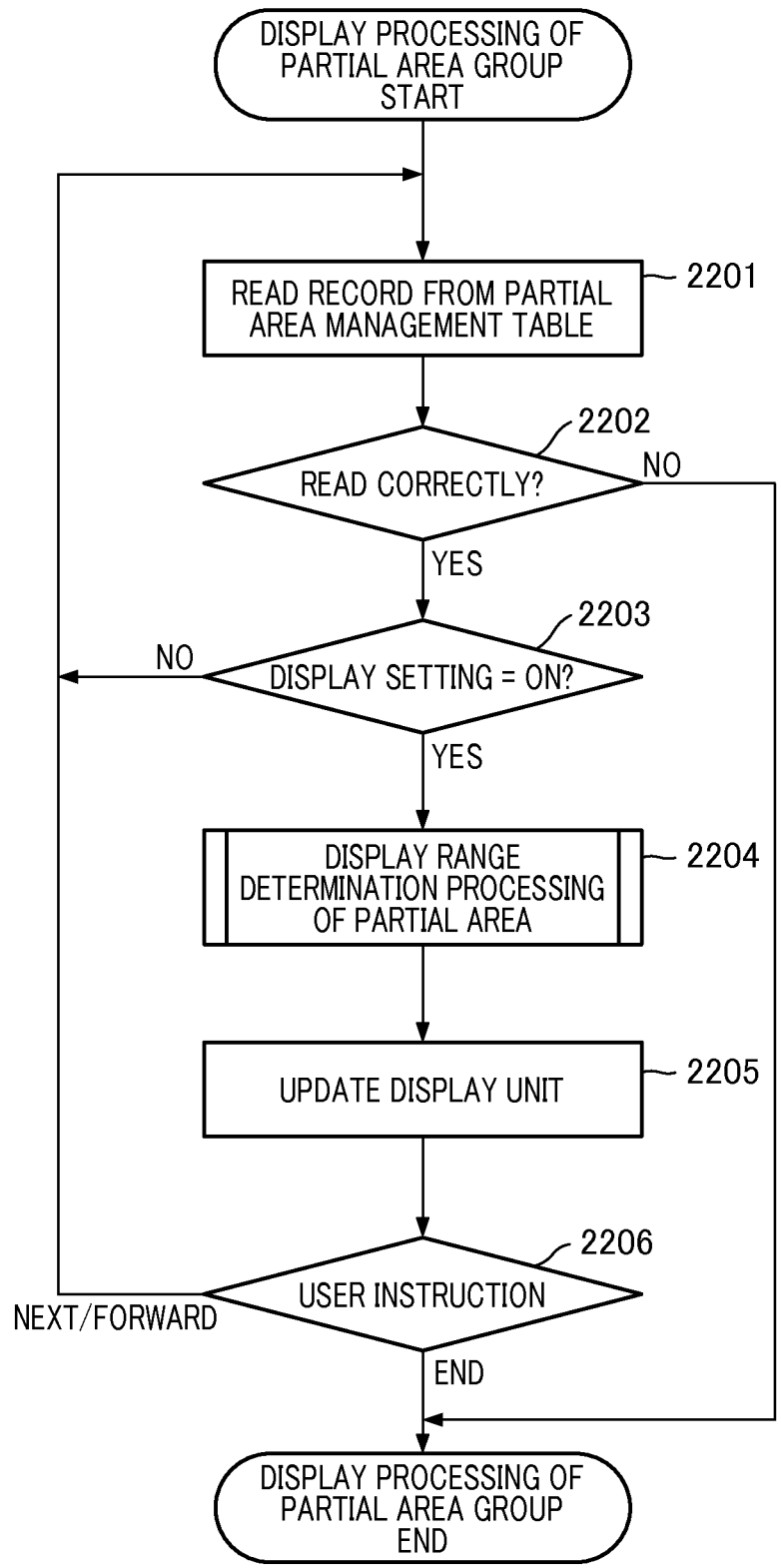
FIG. 22 is a flowchart illustrating display processing of the partial area group.

FIG. 22 is a flowchart illustrating a display processing of a partial area group that is performed by the partial area display unit 204. The partial area group is all partial area records included in one page to be stored in the partial area management table shown in FIG. 18 or the like. The display processing of the partial area group is processing to display the designated partial area in all of the partial area records included in one page in order at the respective magnification rates of each of the partial areas.

For example, in the partial area management table shown in FIG. 18B, the partial area group of page 1 corresponds to the seven partial area records for which the identifiers are ID01 to ID07. Note that the processing procedure of the partial area display unit 204 is included in the image display program stored in the ROM 103 and is executed by the CPU 101.

In step 2201, the partial area display unit 204 acquires the partial area record from the partial area management table. First, the partial area record at the top of the page is acquired. For example, in the case of the first page stored in the partial area management table shown in FIG. 18B, the partial area record for which the identifier is ID01, which the display order is 1, is read.

In step 2202, the partial area display unit 204 determines whether or not the data included in the partial area record has been read correctly. If the data has been correctly read, the processing proceeds to step 2203. If the data has not been correctly read, the display processing of the partial area group ends. For example, if the image data has not been read, the partial area cannot be displayed and, therefore, the display processing of the partial area group ends.

In step 2203, the partial area display unit 204 determines whether or not the display setting 1807 of the partial area record that has been read is ON. If the display setting is ON, the processing proceeds to step 2204. If the display setting is OFF, the processing returns to step 2201 and the partial area record of the next identifier is read. In this step, the partial area record for which the display setting is OFF is remained set to non-display and is skipped.

In step 2204, the partial area display unit 204 follows the step of the display range determination processing of the partial area shown in FIG. 11, and determines the magnification rate and the coordinates of the partial area to be displayed.

In step 2205, the partial area display unit 204 updates the display state of the display unit 105 of the mobile terminal 100, and displays the partial area based on the coordinates and the magnification rate of the partial area determined in step 2204.

In step 2206, the partial area display unit 204 receives a user instruction. When a tap event on the "next" button 301 or the "previous" button is received from the operation control unit 205, the partial area display unit 204 returns to step 2201, reads the next or the previous partial area record, and determines whether or not the corresponding partial area record has been read in step 2202. For example, assume that the tap event on the "next" button or the "previous" button is received when displaying the partial area which is on the first page and for which the identifier ID is 01 and the display order is 1 (the beginning) in FIG. 18B. When the tap event to the "next" button is received, the partial area display unit 204 reads the partial area record for which the display order is next (2) and the identifier is ID02, and continues the processing. In contrast, when the tap event to the "previous" button is received, as the partial area display unit 204 has no partial area record to read, the determination result in step 2202 is NO and the display processing of the partial area group ends.

The partial area display unit 204 repeats the above processing and performs the display processing of the partial area group.

(Display example 4 of the partial area group)

FIGS. 23A to 23D illustrate the screen transition during the display processing of the partial area when the aforementioned editing of the display setting of the partial area is performed. Here, a description will be given of the screen transition of the display unit 105 of the mobile terminal in the case that the partial area management table shown in FIG. 18B is read, and the display processing of the partial area group shown in FIG. 22 and the display range determination processing of the partial area shown in FIG. 11 is performed.

The screen of the mobile terminal transits in the order of FIG. 23A, FIG. 23B, FIG. 23C, and FIG. 23D.

The partial area display unit 204 follows the step of the display processing of the partial area group shown in FIG. 22 and in step 2201, reads the record that the display order is the top of the first page, for which the identifier is ID01, from the partial area management table shown in FIG. 18B. In step 2203, the partial area display unit 204 determines whether or not the display setting of the read partial area record is ON. In this case, as the display setting of the read partial area record (the record for which the identifier is ID01) is ON, the display range determination processing of the partial area is performed in step 2204. In the display range determination processing of the partial area shown in FIG. 11, since the attribute of the partial area record, for which the identifier is ID01, is the background, the partial area display unit 204 executes step 1112 and determines the display magnification rate so that the whole partial area falls within the display unit 105 of the mobile terminal. Furthermore, the partial area display unit 204 executes step 1113 and determines the coordinates of the partial area so that the center of the partial area matches the center of the display unit 105 of the mobile terminal 100. In step 2205 of FIG. 22, the partial area display unit 204 displays the partial area on the display unit 105 of the mobile terminal in accordance with the determined display magnification rate and the coordinates. This display state is shown in FIG. 23A.

When the "next" button 301 is tapped on the display state shown in FIG. 23A (step 2206 in FIG. 22), the partial area display unit 204 reads the next record, for which the display order is 1 and the identifier is ID01, in the partial area management table shown in FIG. 18B. In other words, the partial area record for which the display order is 2, which the identifier is ID02, is read (step 2201 in FIG. 22). In step 2203 of the FIG. 22, the partial area display unit 204 determines whether or not the display setting of the read partial area record is ON. Here, since the display setting of the read partial area record (the record that the identifier is ID02) is OFF, the partial area display unit 204 does not display the partial area designated by the partial area record that the identifier is ID02.

The partial area display unit 204 returns to step 2201 of FIG. 22, and reads the next record for which that the display order is 2 and the identifier is ID02, that is to say, the partial area record for which and the identifier is ID03 is read. In step 2203 of FIG. 22, the partial area display unit 204 determines whether or not the display setting of the read partial area record is ON. Here, since the display setting of the read partial area record (the record for which the identifier is ID03) is OFF, the partial area display unit 204 does not display the partial area designated by the partial area record for which the identifier is ID03.

The partial area display unit 204 returns to step 2201 of FIG. 22, and reads the next record for which the display order is 3 and the identifier is ID02, that is to say, the partial area record for which the display order is 4 and the identifier is ID04 is read. In step 2203 of FIG. 22, the partial area display unit 204 determines whether or not the display setting of the read partial area record is ON. Here, since the display setting of the read partial area record (the record that the identifier is ID04) is ON, the partial area display unit 204 performs the display range determination processing of the partial area in step 2204. In the display range determination processing of the partial area shown in FIG. 11, since the attribute of the partial area record, for which the identifier is ID04, is the drawing, the partial area display unit 204 executes step 1112 and determines the display magnification rate so that the whole partial area falls within the display unit 105 of the mobile terminal. Furthermore, the partial area display unit 204 executes step 1113 and determines the coordinates of the partial area so that the center of the partial area matches the center of the display unit 105 of the mobile terminal 100. In step 2205 of FIG. 22, the partial area display unit 204 displays the partial area on the display unit 105 of the mobile terminal in accordance with the determined display magnification rate and the coordinate. This display state is shown in FIG. 23B.

Figure 23B:
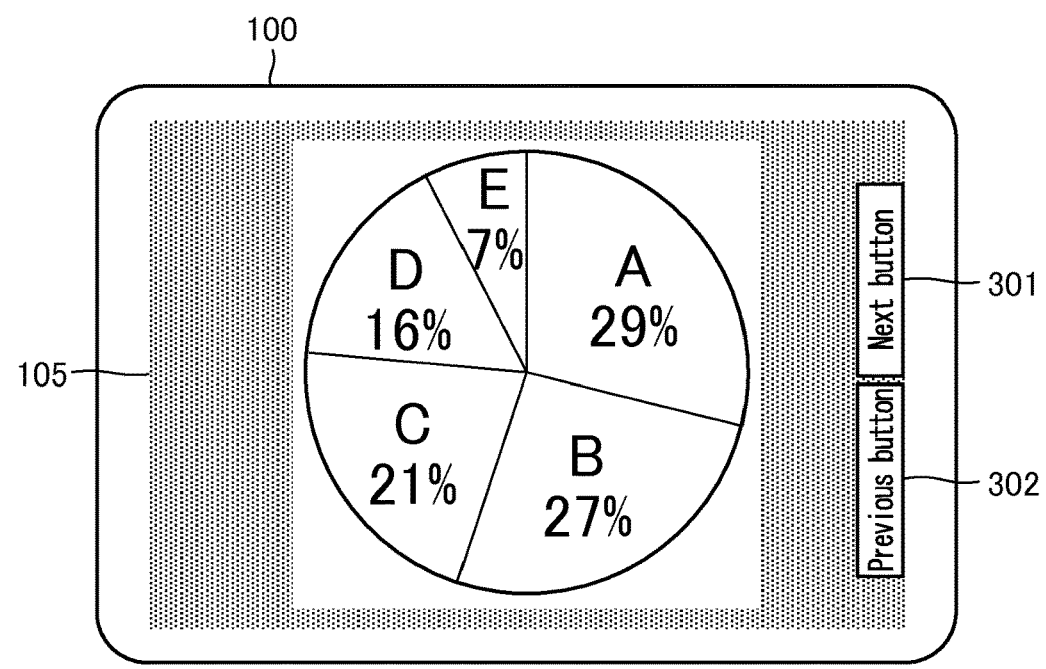

When the "next" button 301 is tapped on the display state shown in FIG. 23B (step 2206 in FIG. 22), the partial area display unit 204 reads the next record, for which the display order is 4 and the identifier is ID04, in the partial area management table shown in FIG. 18B. In other words, the partial area record for which the display order is 5 and the identifier is ID07, is read (step 2201 in FIG. 22). In step 2203, the partial area display unit 204 determines whether or not the display setting of the read partial area record is ON. Here, since the display setting of the read partial area record (the record that the identifier is ID05) is ON, the partial area display unit 204 performs the display range determination processing of the partial area in step 2204. In the display range determination processing of the partial area shown in FIG. 11, since the attribute of the partial area record, for which the identifier is ID07, is the manual specification, the partial area display unit 204 executes step 1112 and determines the display magnification rate so that the whole partial area falls within the display unit 105 of the mobile terminal. Furthermore, the partial area display unit 204 executes step 1113 and determines the coordinate of the partial area so that the center of the partial area matches the center of the display unit 105 of the mobile terminal 100. In step 2205 of FIG. 22, the partial area display unit 204 displays the partial area on the display unit 105 of the mobile terminal in accordance with the determined display magnification rate and the coordinates. This display state is shown in FIG. 23C.

Figure 23C:
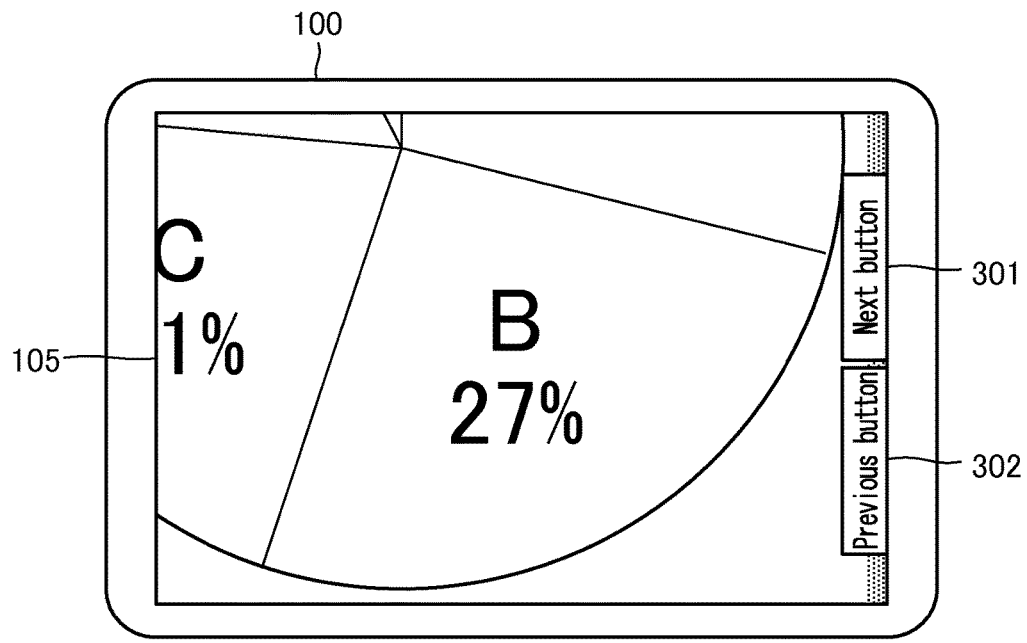

When the "next" button 301 is tapped on the display state shown in FIG. 23C (step 2206 in FIG. 22), the partial area display unit 204 reads the next record, for which the display order is 5 and the identifier is ID07, in the partial area management table shown in FIG. 18B. In other words, the partial area record for which the display order is 6 and the identifier is ID05, is read (step 2201 in FIG. 22). In step 2203, the partial area display unit 204 determines whether or not the display setting of the read partial area record is ON. Here, since the display setting of the read partial area record (the record that the identifier is ID05) is ON, the partial area display unit 204 performs the display range determination processing of the partial area in step 2204. In the display range determination processing of the partial area shown in FIG. 11, since the attribute of the partial area record, for which the identifier is ID05, is the photograph, the partial area display unit 204 executes step 1112 and determines the display magnification rate so that the whole partial area falls within the display unit 105 of the mobile terminal. Furthermore, the partial area display unit 204 executes step 1113 and determines the coordinates of the partial area so that the center of the partial area matches the center of the display unit 105 of the mobile terminal 100. In step 2205 of FIG. 22, the partial area display unit 204 displays the partial area on the display unit 105 of the mobile terminal in accordance with the determined display magnification rate and the coordinates. This display state is shown in FIG. 23D.

Figure 23D:
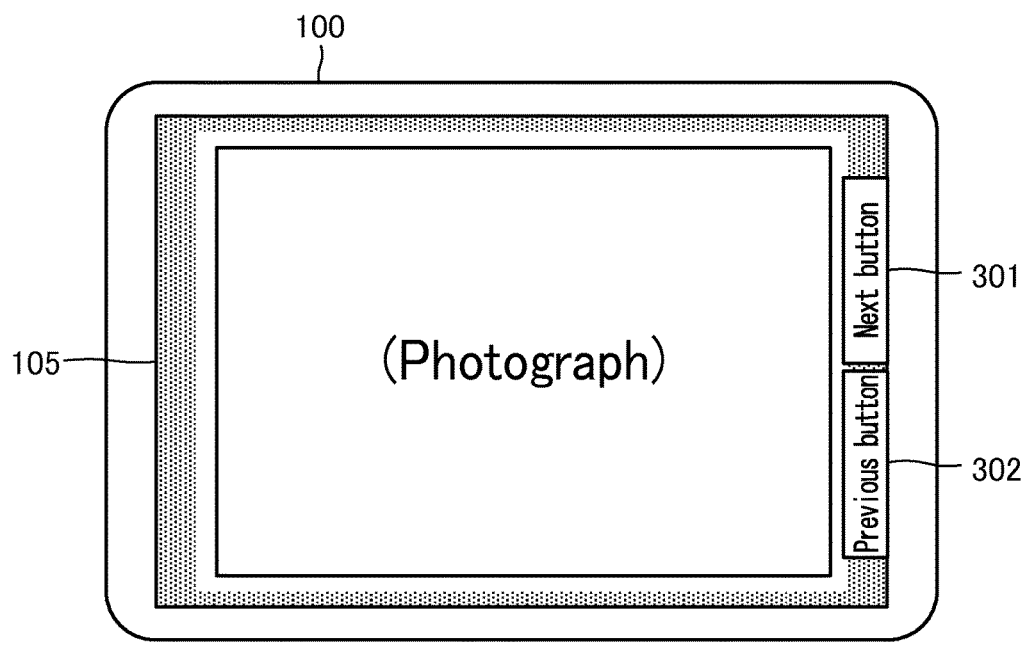

When the "next" button 301 is tapped on the display state shown in FIG. 23D (step 2206 in FIG. 22), the partial area display unit 204 reads the next record of the record, for which the display order is 6 and the identifier is ID05, in the partial area management table shown in FIG. 18B. In other words, the partial area record for which the display order is 7 and the identifier is ID06 is read (step 2201 in FIG. 22). In step 2203 of FIG. 22, the partial area display unit 204 determines whether or not the display setting of the read partial area record is ON. Since the display setting of the read partial area record (the record that the identifier is ID06) is OFF, the partial area display unit 204 does not display the partial area designated by the partial area record that the identifier is ID06.

As described above, according to the present embodiment, the user can set the display or non-display of the respective partial area with a simple operation. This display processing of the display setting of the partial area can be performed to both the automatically recognized partial area and the manually specified partial area in a same simple operation. Also, both the display settings of the automatically recognized partial area and the manually specified partial area can be managed in the same management table. Herewith, for example, the user can display the partial area that is a part that is necessary for explaining in the presentation or the like among the automatically recognized partial areas and the manually specified partial areas with the magnification rate for each of the partial areas by a simple operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-156337, filed Jul. 31, 2014, which is hereby incorporated by reference wherein in its entirety.

What is claimed is:

1. An image display apparatus comprising a controller including a memory storing instructions and a processor that executes the instructions, the controller being configured to function as units comprising:
    an automatic recognition unit configured to automatically recognize a plurality of objects included in an image;
    a management unit configured to manage information related to an automatically recognized object as management information which comprises information about a display order of each object;
    a display control unit configured to display, on a screen, one object at a time as a display target object among the plurality of objects according to the display order;
    a specification unit configured to specify, as an object, a region being displayed on the screen, as a result of following an instruction received from a user for changing a display magnification rate, where the instruction is performed in a state in which the display target object that has been automatically recognized by the automatic recognition unit is being displayed on the screen, wherein the region is a region that has not been automatically recognized as an object by the automatic recognition unit; and
    an update unit configured to update the management information by adding information related to the object specified by the specification unit to the management information, wherein the information related to the object specified by the specification unit comprises a display order of the object specified by the specification unit,
    wherein the display control unit displays, on the screen, the display target object among the plurality of objects according to the display order based on the updated management information.

2. The image display apparatus according to claim 1, wherein the region that has not been automatically recognized as an object by the automatic recognition unit and is being displayed on the screen at the time that the instruction from the user has been received is an object that is not automatically recognized by a pinch-in operation or a pinch-out operation of the user, and
    wherein the management unit includes a position and a size, which is determined by the pinch-in operation or the pinch-out operation, of the object that is specified by the specification unit in the management information and manages the management information.

3. The image display apparatus according to claim 2, wherein the display control unit calculates a magnification rate of the display target object based on the position and the size that are managed by the management unit and a size of the screen, magnifies the display target object with the magnification rate, and displays the display target object.

4. The image display apparatus according to claim 3, wherein the magnification rate is calculated so that the display target object falls within a display unit of the screen.

5. The image display apparatus according to claim 1, wherein the update unit updates the management information so as to place a location in the display order of the object that is specified by the specification unit immediately after a location in the display order of the object that is automatically recognized, which is being displayed at the time that the region is specified as the object.

6. The image display apparatus according to claim 5, wherein, when the object is specified by the specification unit, if there is a plurality of objects that are automatically recognized and displayed on the screen, the update unit places a location in the display order of the object that is specified by the specification unit immediately after the last location in the display order of the plurality of objects that are automatically recognized.

7. The image display apparatus according to claim 1, further comprising:
    a selection unit configured to select whether or not to display each of the plurality of objects of the image, which is managed by the management unit.

8. The image display apparatus according to claim 2, wherein the display control unit displays a user interface for providing instructions for deletion of the management information of the display target object in a case that a long tap operation is performed on the screen by the user.

9. An image display method comprising:
    automatically recognizing a plurality of objects included in an image;
    managing information related to an automatically recognized object as management information which comprises information about a display order of each object;
    displaying, on a screen, one object at a time as a display target object among the plurality of objects according to the display order;

specifying, as an object, a region being displayed on the screen, as a result of following an instruction received from a user for changing a display magnification rate, where the instruction is performed in a state in which the display target object that has been automatically recognized is being displayed on the screen, wherein the region is a region that has not been automatically recognized as an object in the recognizing; and updating the management information by adding information related to the object specified in the specifying to the management information, wherein the information related to the object specified in the specifying comprises a display order of the specified object, wherein, in the displaying, the display target object is displayed, on the screen, among the plurality of objects according to the display order based on the updated management information.

10. A non-transitory storage medium on which is stored a computer program for making a computer execute an image display method, the method comprising:

automatically recognizing a plurality of objects included in an image;

managing information related to an automatically recognized object as management information which comprises information about a display order of each object;

displaying, on a screen, one object at a time as a display target object among the plurality of objects according to the display order;

specifying, as an object, a region being displayed on the screen, as a result of following an instruction received from a user for changing a display magnification rate, where the instruction is performed in a state in which the display target object that has been automatically recognized is being displayed on the screen, wherein the region is a region that has not been automatically recognized as an object in the recognizing; and updating the management information by adding information related to the object specified in the specifying to the management information, wherein the information related to the object specified in the specifying comprises a display order of the specified object, wherein, in the displaying, the display target object is displayed, on the screen, among the plurality of objects according to the display order based on the updated management information.

* * * * *